May 16, 1944.  W. H. SPRENGER  2,348,936
COIN SORTING AND COUNTING MACHINE
Filed Oct. 11, 1940  22 Sheets-Sheet 1

Inventor
WILLIAM H. SPRENGER

By Milans & Milans
Attorneys

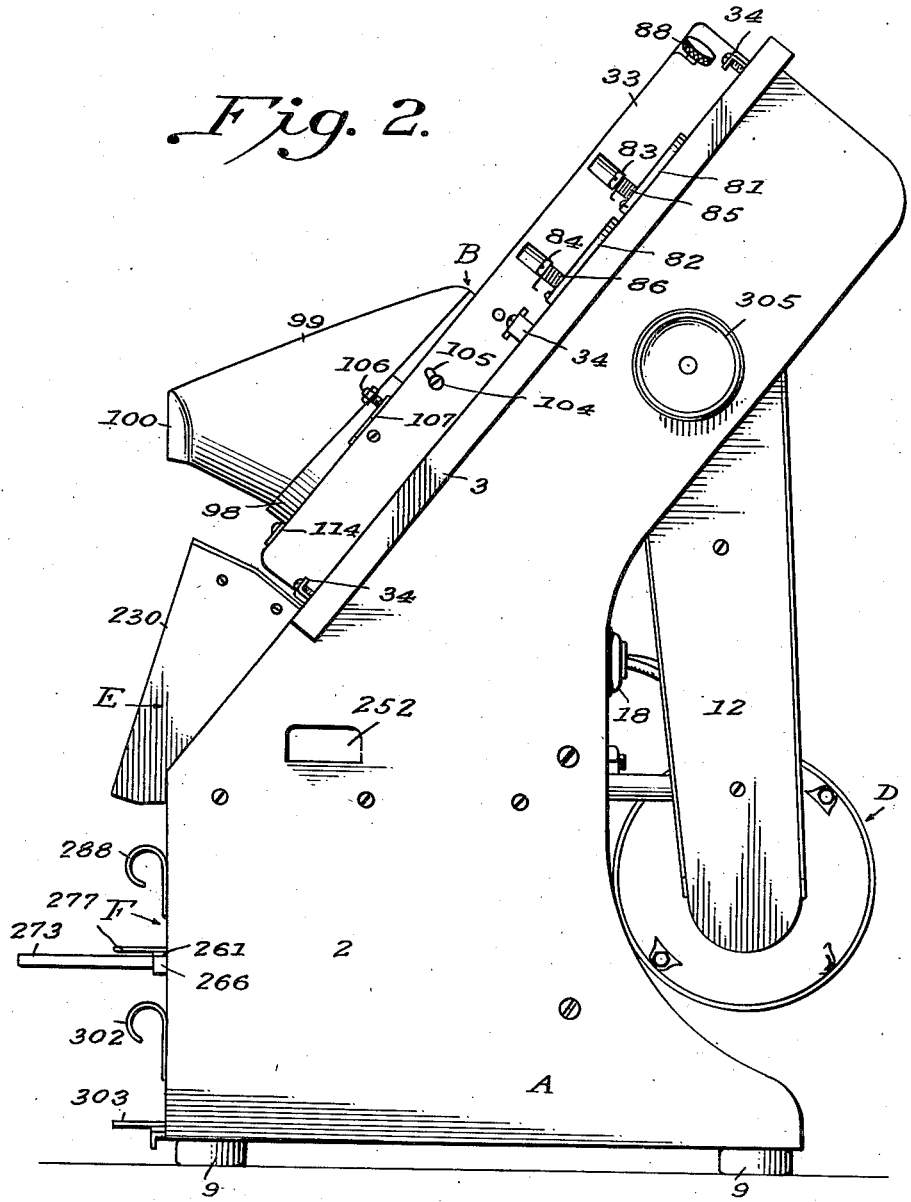

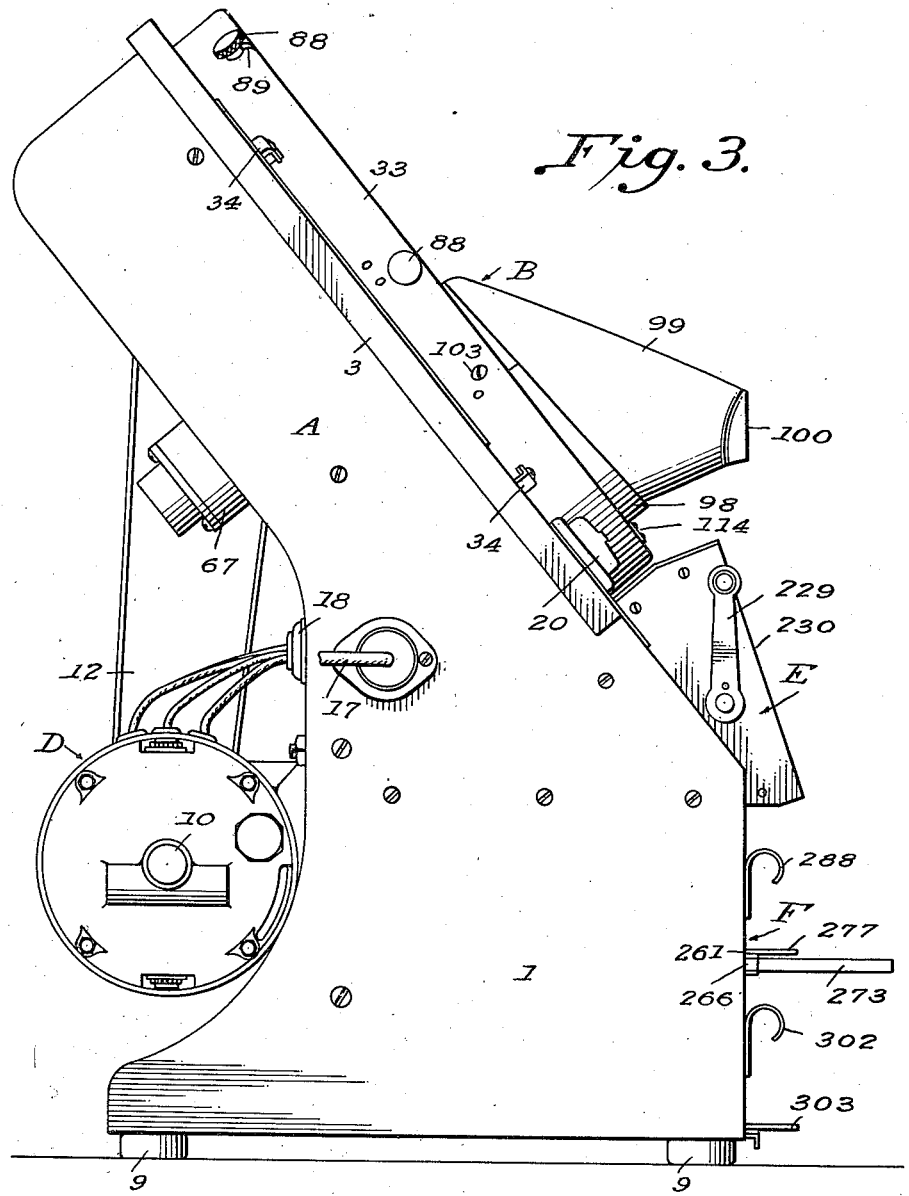

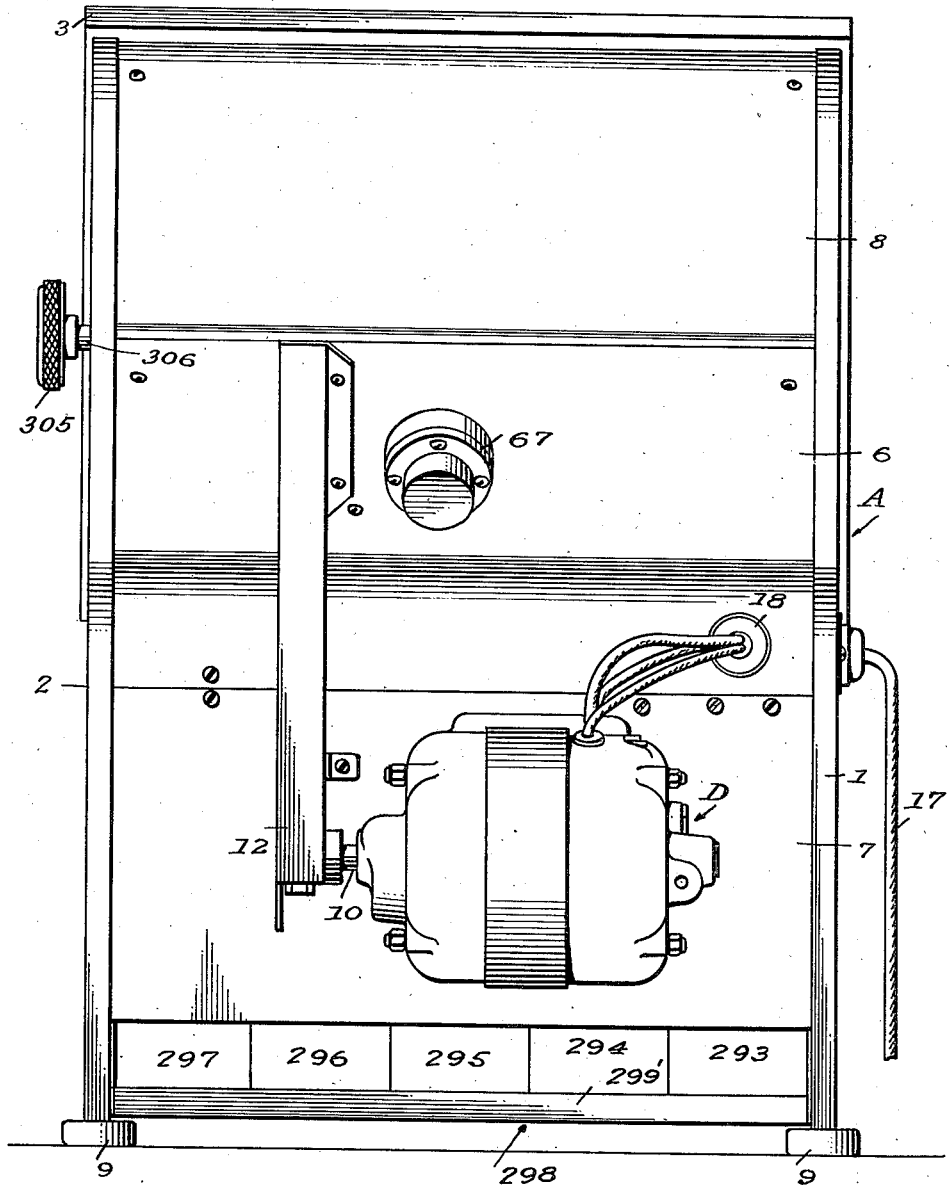

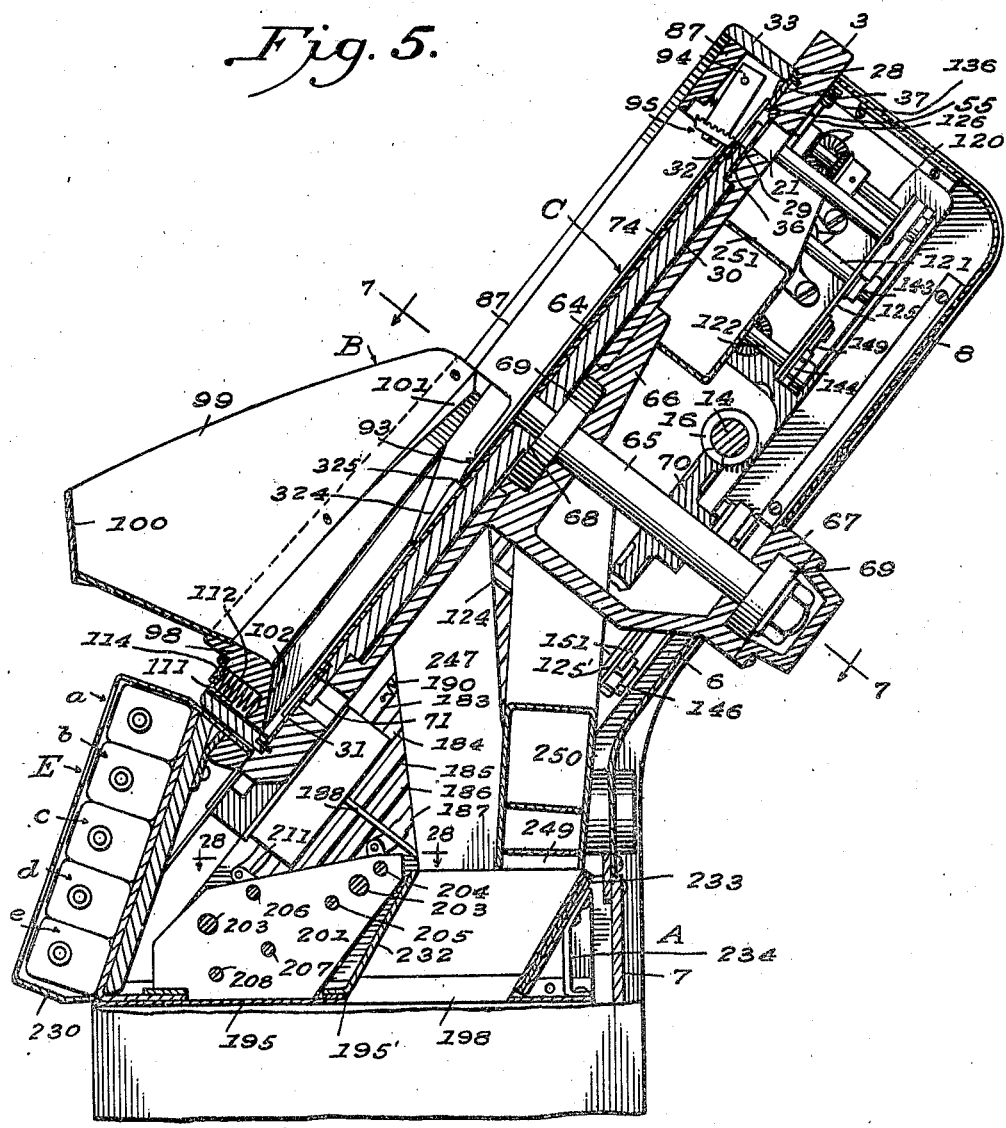

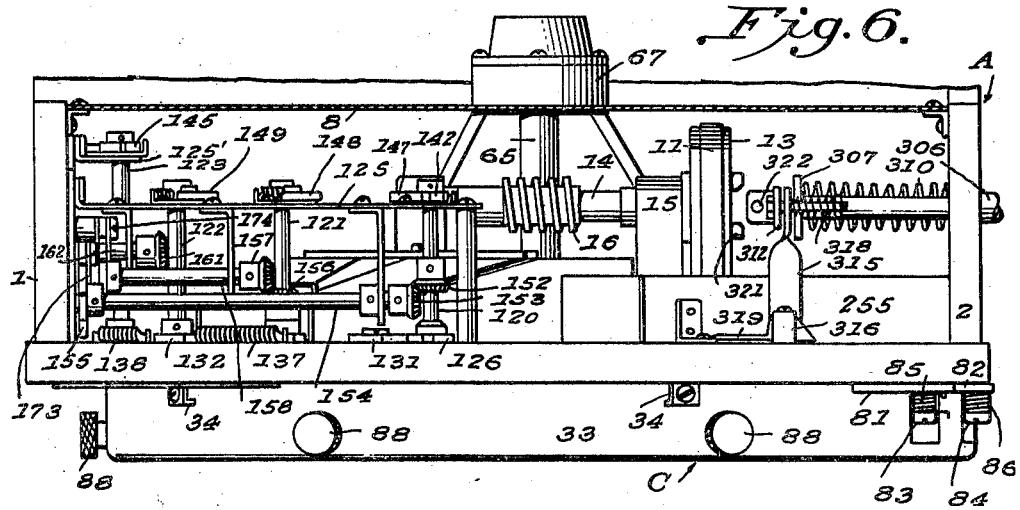
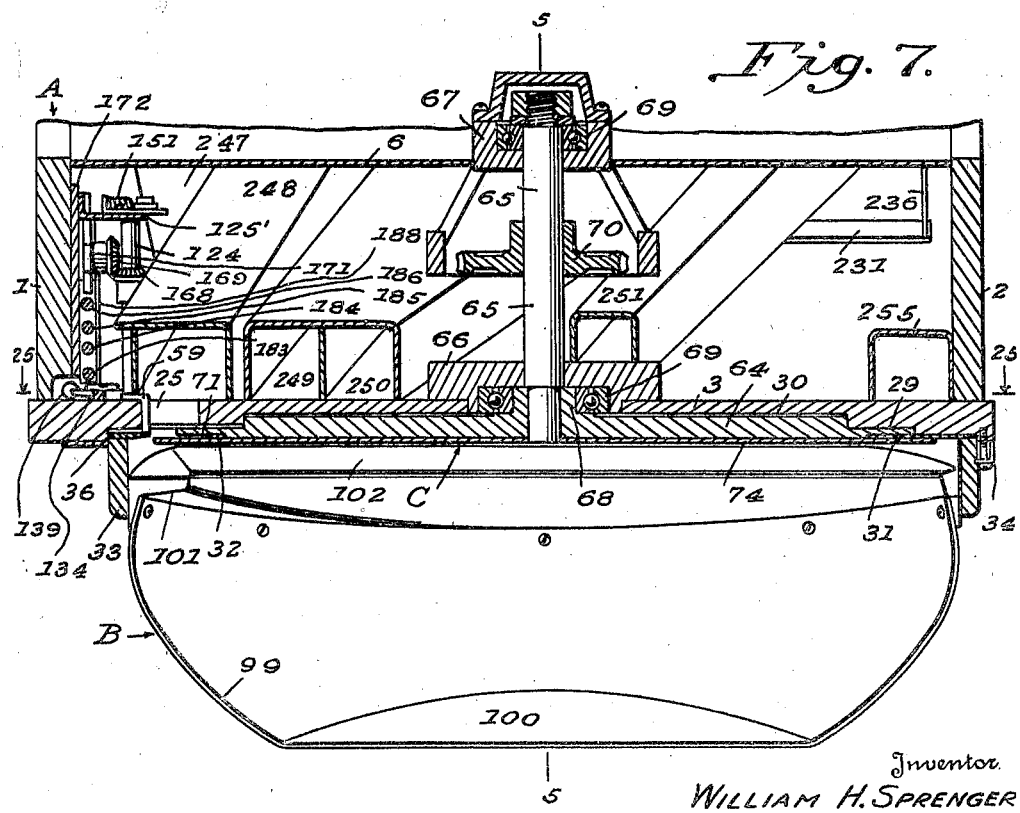

May 16, 1944. W. H. SPRENGER 2,348,936
COIN SORTING AND COUNTING MACHINE
Filed Oct. 11, 1940 22 Sheets-Sheet 9

Inventor
WILLIAM H. SPRENGER

By Milans & Milans
Attorneys

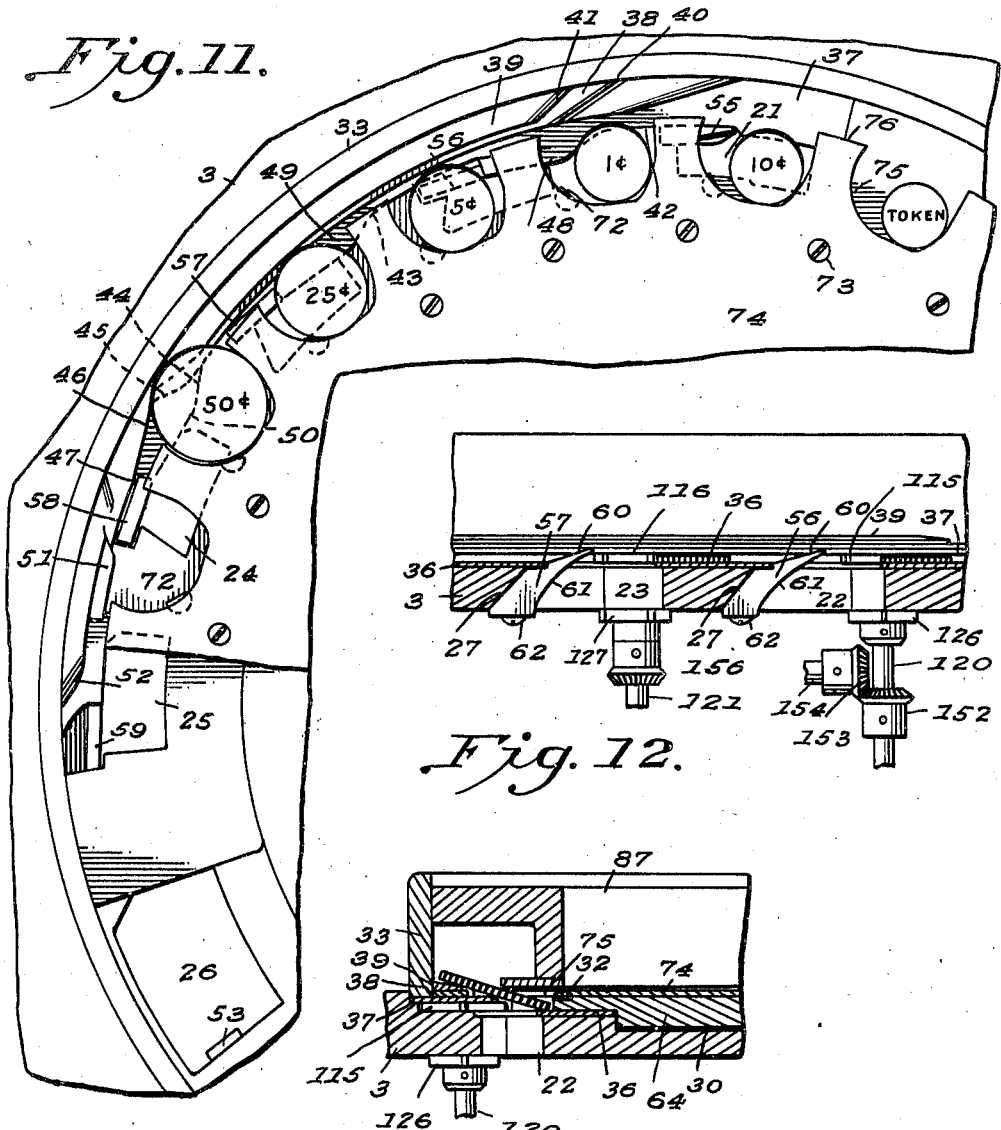

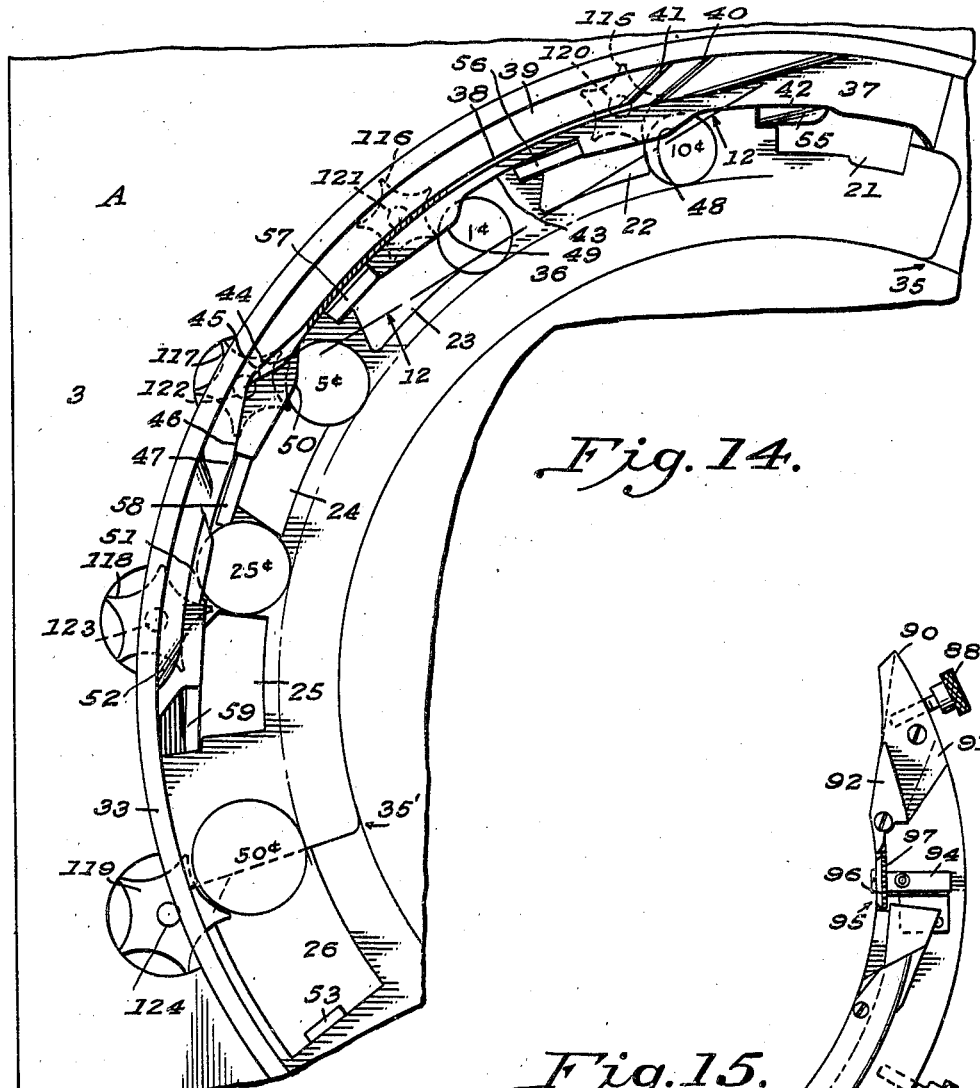
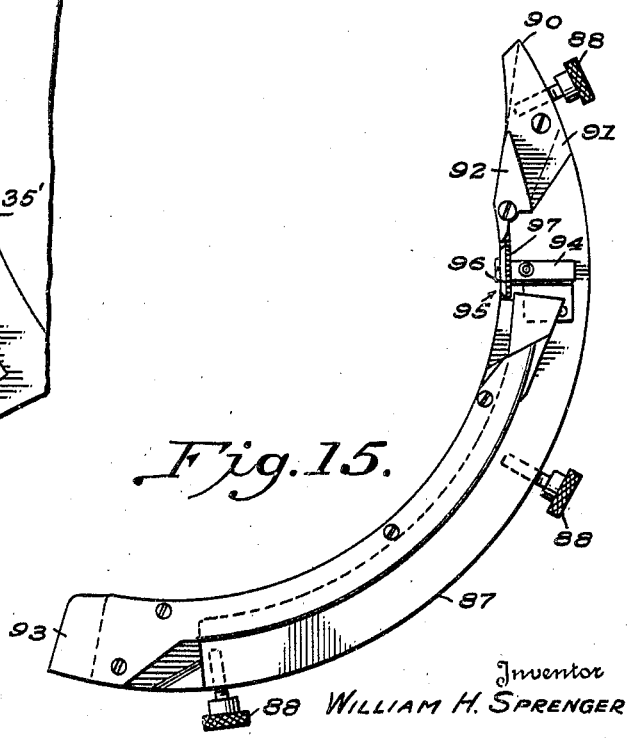

May 16, 1944. W. H. SPRENGER 2,348,936
COIN SORTING AND COUNTING MACHINE
Filed Oct. 11, 1940 22 Sheets-Sheet 12

Inventor
WILLIAM H. SPRENGER
By Milans & Milans
Attorneys

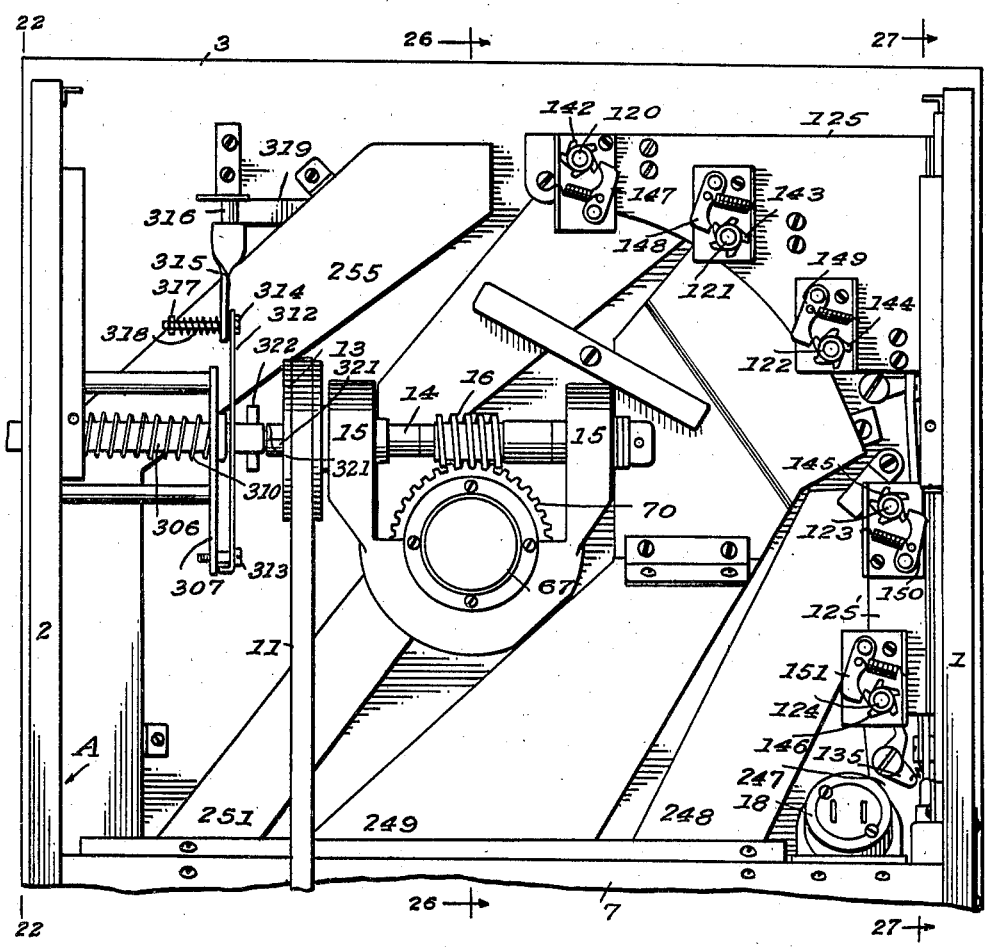
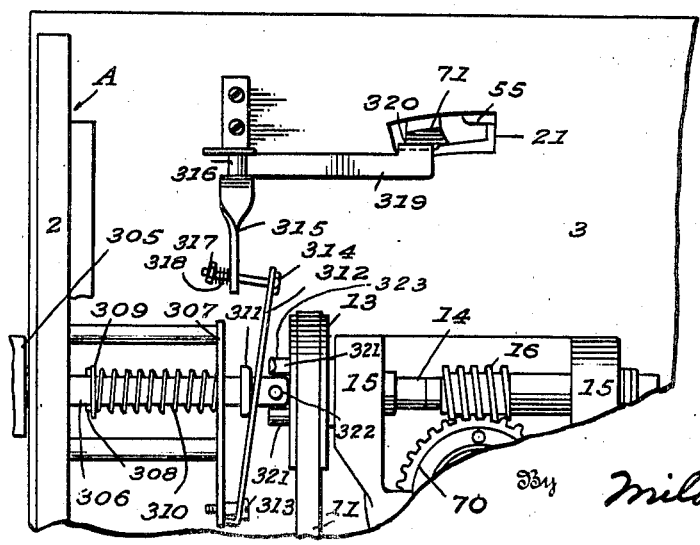
Fig. 20.
Fig. 21.
Inventor
WILLIAM H. SPRENGER

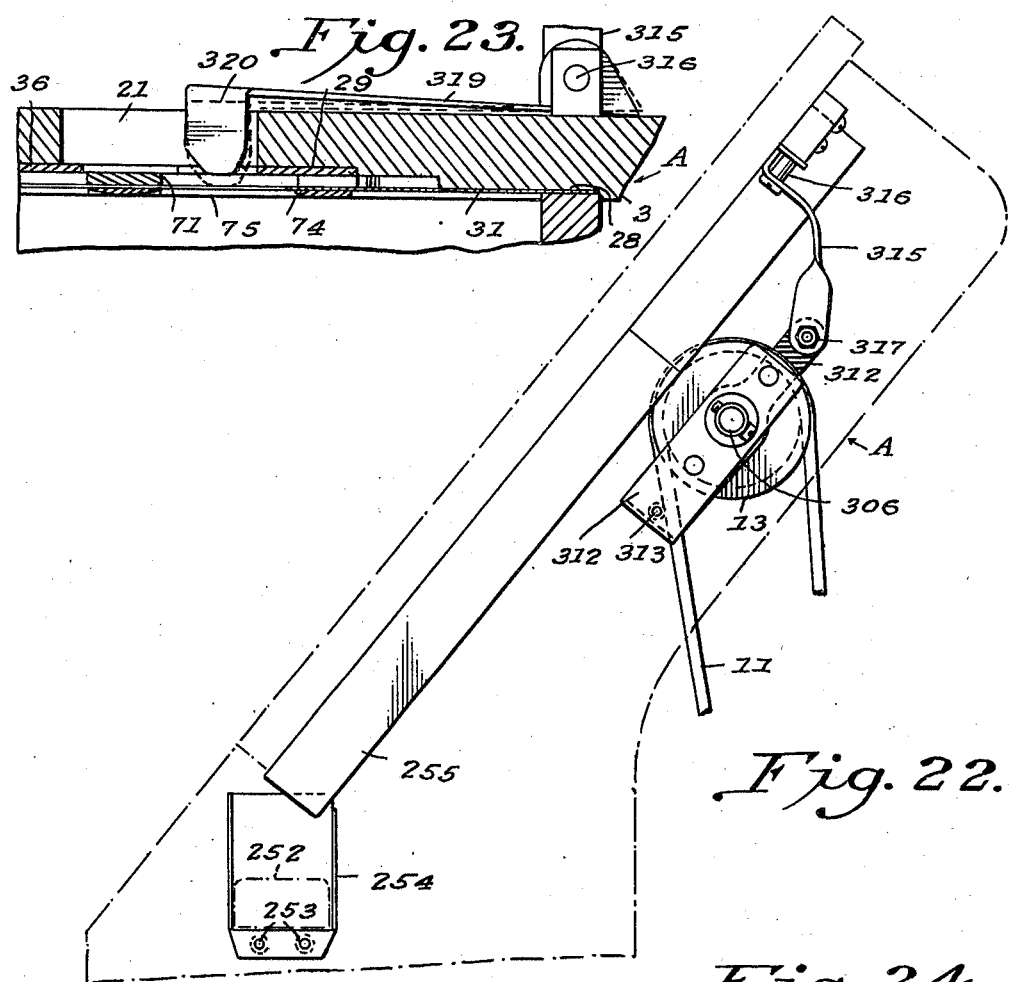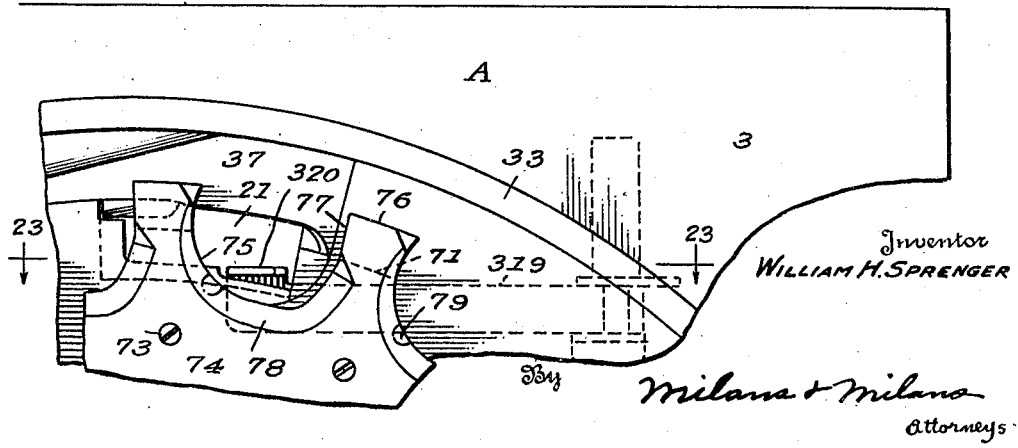

May 16, 1944.   W. H. SPRENGER   2,348,936
COIN SORTING AND COUNTING MACHINE
Filed Oct. 11, 1940   22 Sheets-Sheet 15

Inventor
WILLIAM H. SPRENGER

By Milana & Milana
Attorneys

May 16, 1944. W. H. SPRENGER 2,348,936
COIN SORTING AND COUNTING MACHINE
Filed Oct. 11, 1940 22 Sheets-Sheet 17

Inventor
WILLIAM H. SPRENGER
By Milans & Milans
Attorneys

May 16, 1944.　　　W. H. SPRENGER　　　2,348,936
COIN SORTING AND COUNTING MACHINE
Filed Oct. 11, 1940　　　22 Sheets-Sheet 18

Inventor
WILLIAM H. SPRENGER

By Milans & Milans
Attorneys

May 16, 1944.   W. H. SPRENGER   2,348,936
COIN SORTING AND COUNTING MACHINE
Filed Oct. 11, 1940   22 Sheets-Sheet 19

Inventor
WILLIAM H. SPRENGER
By Milans & Milans
Attorneys

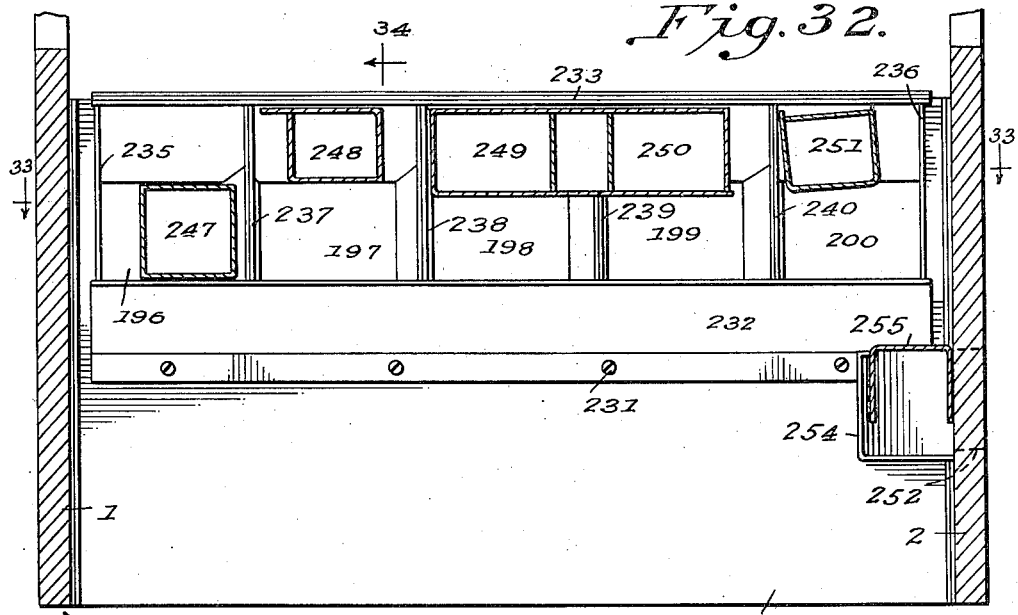
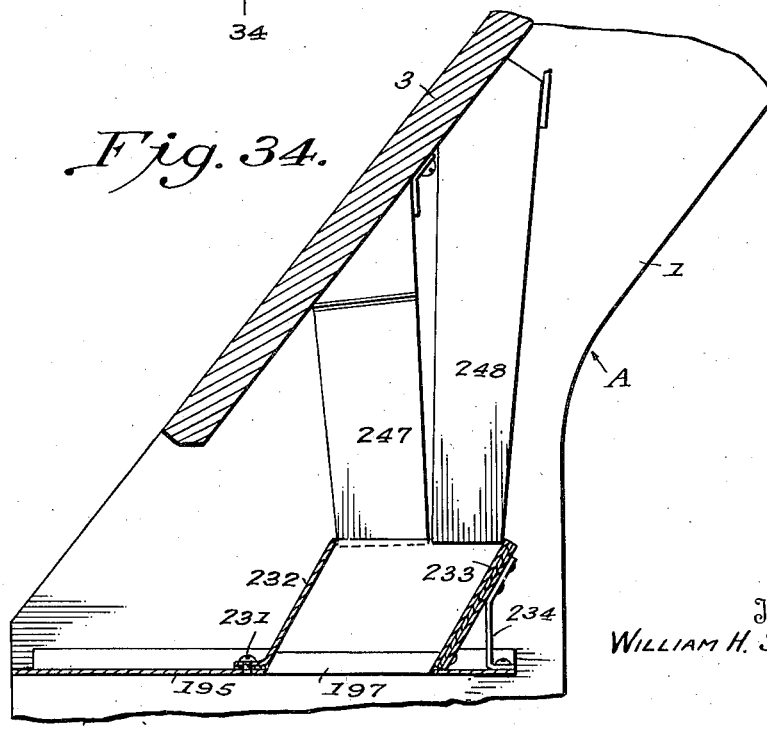

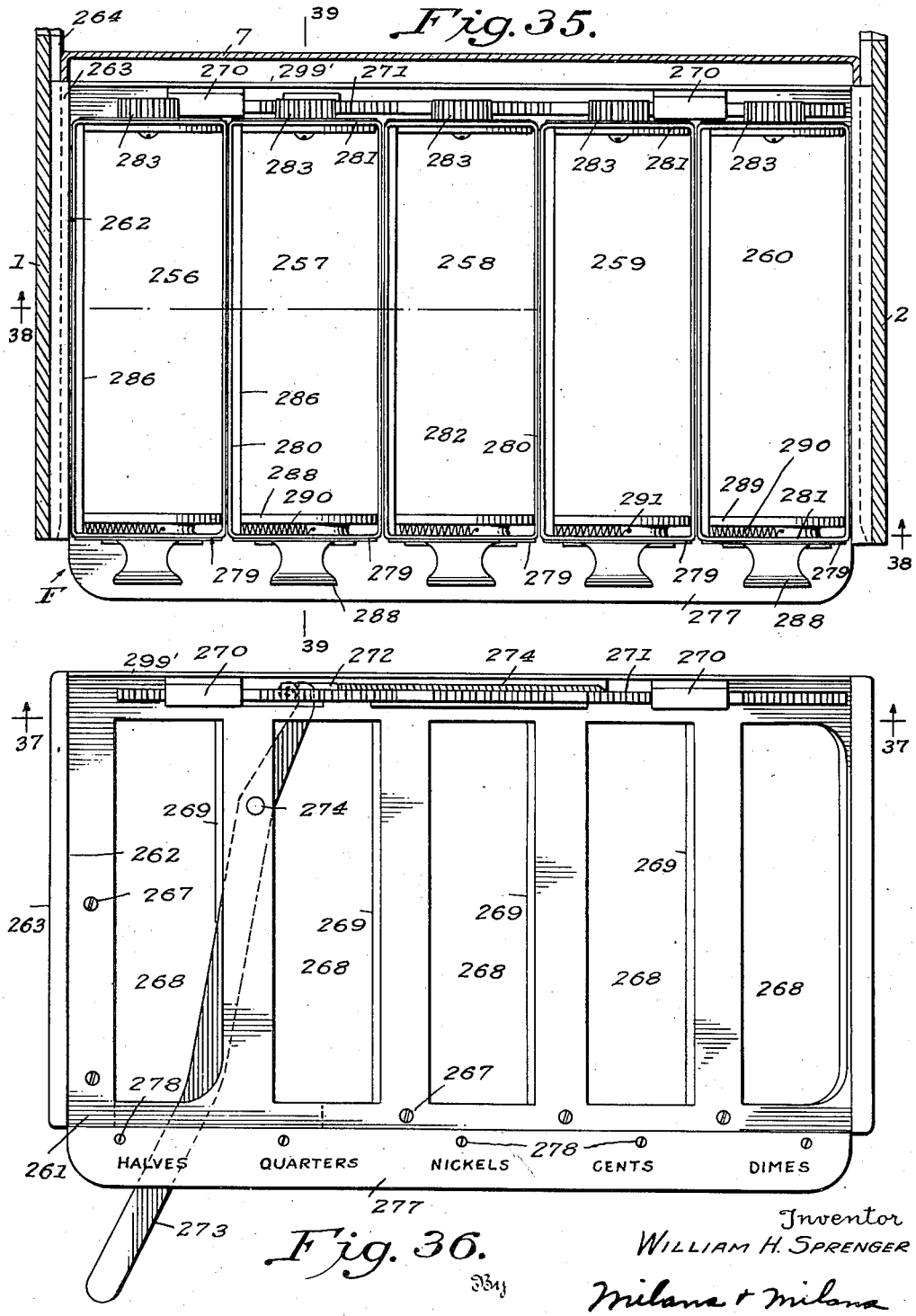

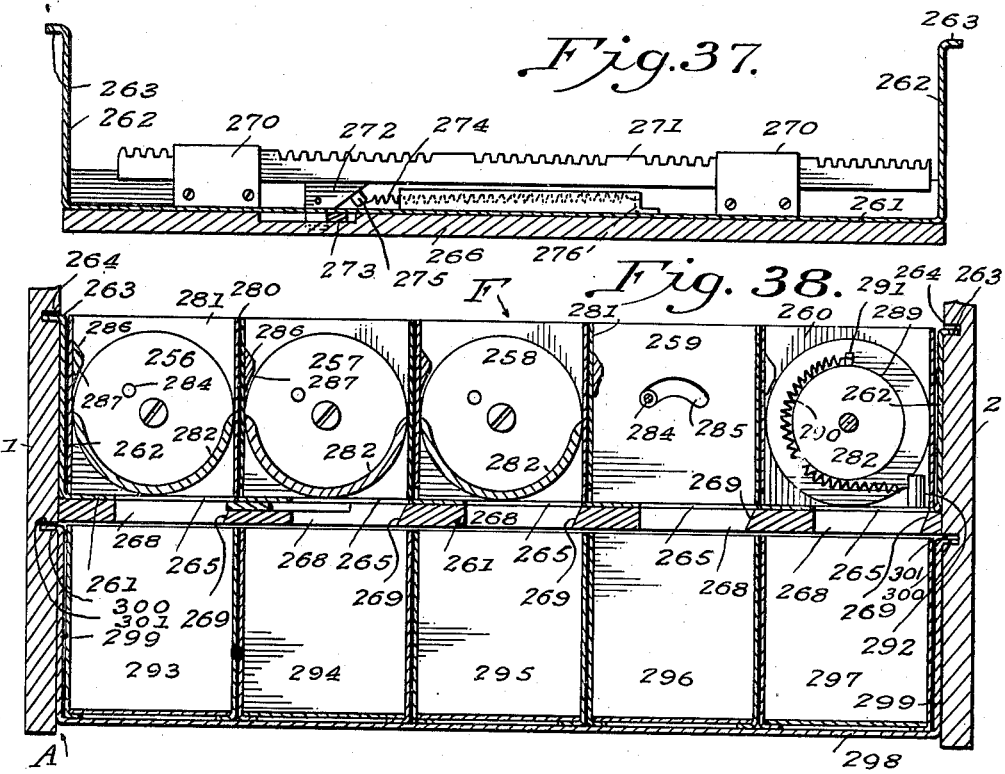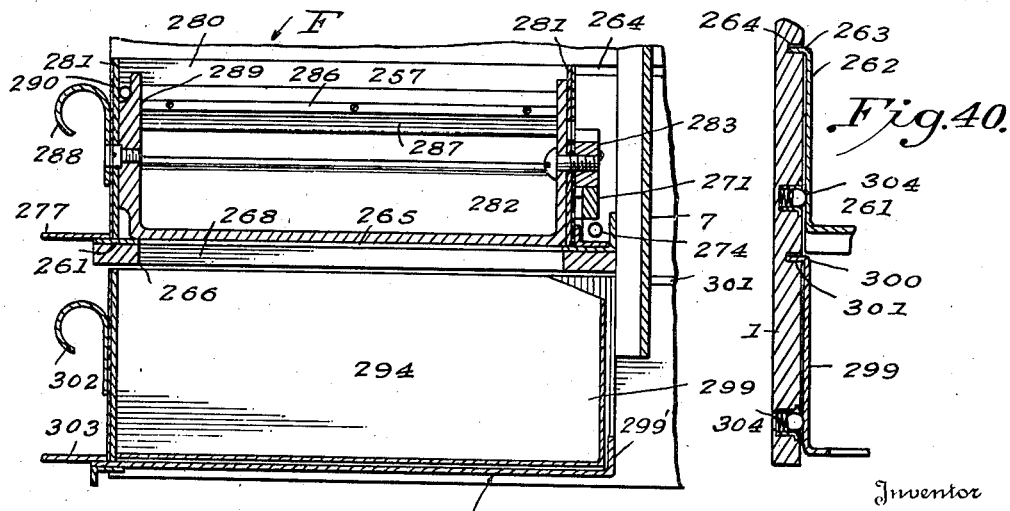

Patented May 16, 1944

2,348,936

UNITED STATES PATENT OFFICE 2,348,936

COIN SORTING AND COUNTING MACHINE

William H. Sprenger, Watertown, Wis., assignor to Brandt Automatic Cashier Company, Watertown, Wis., a corporation of Wisconsin Application October 11, 1940, Serial No. 360,834

17 Claims. (Cl. 133—3)

My invention relates to new and useful improvements in money handling machines and more particularly to a machine for sorting coins of different denominations and depositing the sorted coins of each denomination into a separate drawer or receptacle, a register or counting mechanism being provided for registering the total amount of each denomination deposited.

The principal object of the invention resides in the provision of a machine of the character described which will be rapid and accurate in operation and which is of a size adapting it to be used in a relatively small space, the machine being preferably motor driven.

Another object of the invention consists in the provision of a machine of the character described including a hopper into which a batch of coins of various denominations may be deposited and a rotary elevator or conveyor to carry the coins to what might be termed the sorting unit, the sorting being accomplished at the same level as the base plate of the hopper with the sorting edges at varying radiuses from the center while the coin is always at a constant radius from the center.

A further object of the invention resides in the provision of a machine of the character described formed and adapted to separate car tokens or the like from the coins and discharge the same from the machine without counting.

With the above and other objects in view which will appear as the description proceeds my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings—

Fig. 2 is a side elevation of the right hand side of the machine when looking towards the front thereof.

Fig. 3 is a side elevation of the left hand side of the machine when looking towards the front thereof.

Fig. 4 is a rear elevation.

Fig. 5 is a vertical section through the center of the machine on the line 5—5 of Fig. 7.

Fig. 6 is a top plan with the top cover plate and hopper apron removed showing the interior of the machine.

Fig. 7 is a central horizontal section through the machine on the line 7—7 of Fig. 5.

Fig. 11 is a fragmentary view showing a portion of the conveyor with the coins riding on their sorting ledges.

Fig. 12 is a fragmentary section on the line 12—12 of Fig. 14.

Fig. 13 is a fragmentary section on the line 13—13 of Fig. 8.

Fig. 14 is a view similar to Fig. 11 with the coins progressed past the sorting ledges and resting on the base plate of the hopper and in contact with the operating star wheels of the registering mechanism.

Fig. 15 is a bottom plan of the coin guard or gauge which overlies the conveyor.

Fig. 20 is a back view with the back cover plate removed.

Fig. 21 is a detail of the hand operated mechanism for reversing the conveyor and the means for raising a coin in said reverse movement.

Fig. 22 is a fragmentary elevation substantially on the line 22—22 of Fig. 20 with the side frame shown dotted in.

Fig. 23 is a section on the line 23—23 of Fig. 24.

Fig. 24 is an enlarged view in front elevation of the means shown in Figs. 21, 22 and 23 for raising a coin in the reverse operation of the coin conveyor.

Fig. 32 is a section on the line 32—32 of Fig. 31 looking in the direction of the arrows.

Fig. 34 is a section on the line 34—34 of Fig. 32 looking in the direction of the arrows.

Fig. 35 is a plan of the top tray and coin receiving receptacles carried thereby.

Fig. 36 is a plan of the top coin receptacle tray with the receptacles removed.

Fig. 37 is a section on the line 37—37 of Fig. 36 looking in the direction of the arrows.

Fig. 38 is a section on the line 38—38 of Fig. 35 looking in the direction of the arrows.

Fig. 39 is a section on the line 39—39 of Fig. 35; and

Fig. 40 is a detail showing end portions of the trays for the coin receiving receptacles and retaining means therefor.

Figure 1:
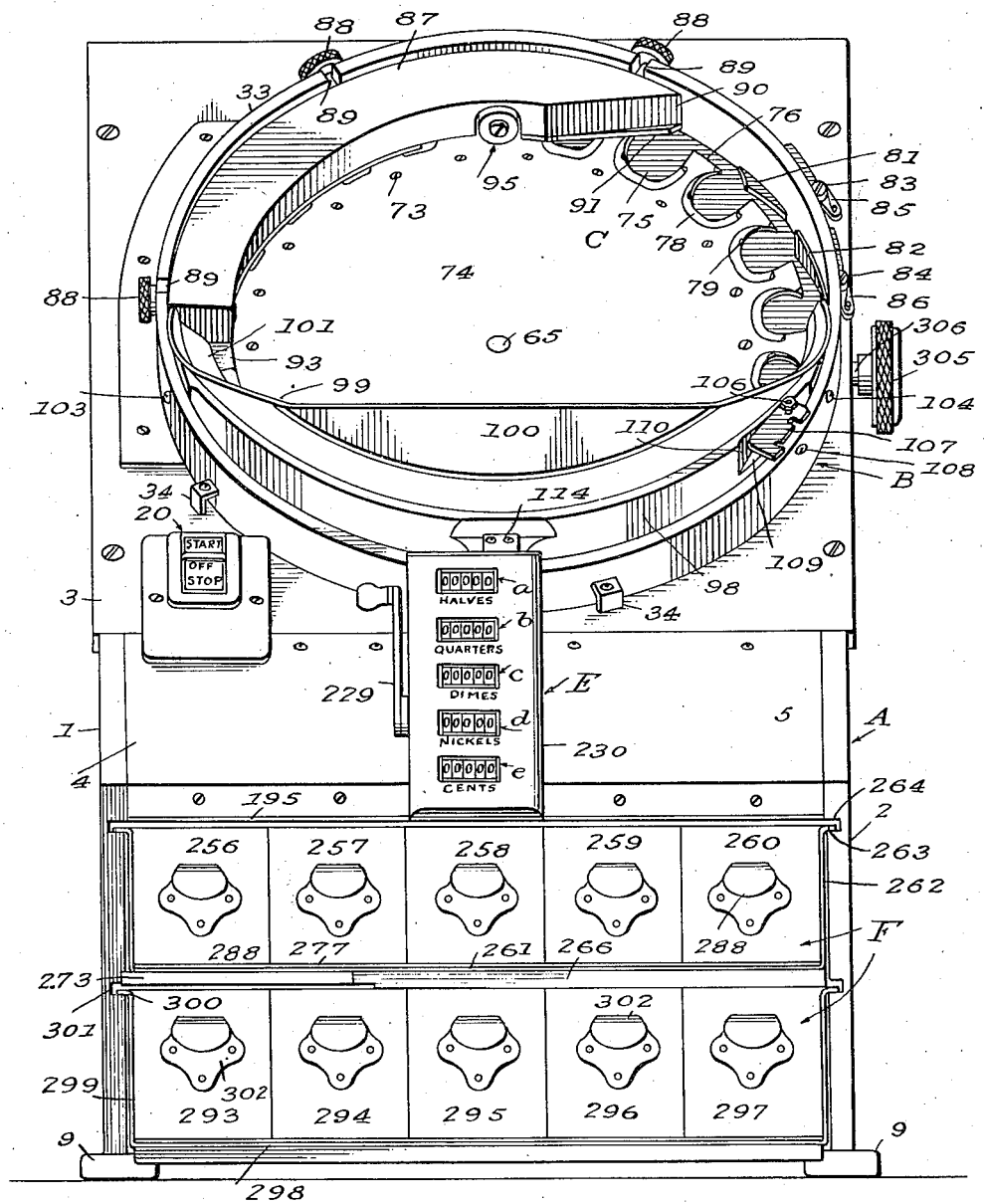
Fig. 1 is a front elevation.

In the drawings A denotes generally a casing or housing forming a support for the operating mechanism, B denotes generally a hopper into which a batch of coins of various denominations to be sorted may be deposited, C denotes generally a rotatable elevator or conveyor for carrying the coins to the sorting unit, D denotes generally the motor for driving the elevator, and E denotes generally a register or counting mechanism for registering the total amount of each denomination of coins sorted and deposited in the drawers or receptacles indicated generally at F.

The casing or housing indicated generally at A includes the side walls 1 and 2, the inclined front wall 3, below which are positioned the removable plates 4 and 5, the rear wall formed by the removable plates 6 and 7, the removable top plate 8, and supporting feet 9. The casing or housing is open at the front below the plates 4 and 5 to receive the receptacles or drawers indicated generally at F and which will be later described in detail.

The electric motor D is supported from the plate 7 and has the shaft 10 for driving the belt 11 normally enclosed in the belt housing 12. The upper end of the belt 11 goes around the pulley 13 carried by the shaft 14, rotatably mounted in the bearings 15, the shaft having the worm gear 16 intermediate its ends as shown more particularly in Fig. 20 of the drawings. At 17 I have shown the lead in for the current from the source of supply to the motor and the motor is plugged in at 18. A switch for starting and stopping the motor is shown at 20 and as this switch and the lead-ins for the current form no part of the present invention a further detailed description thereof will not be given.

Figure 10:
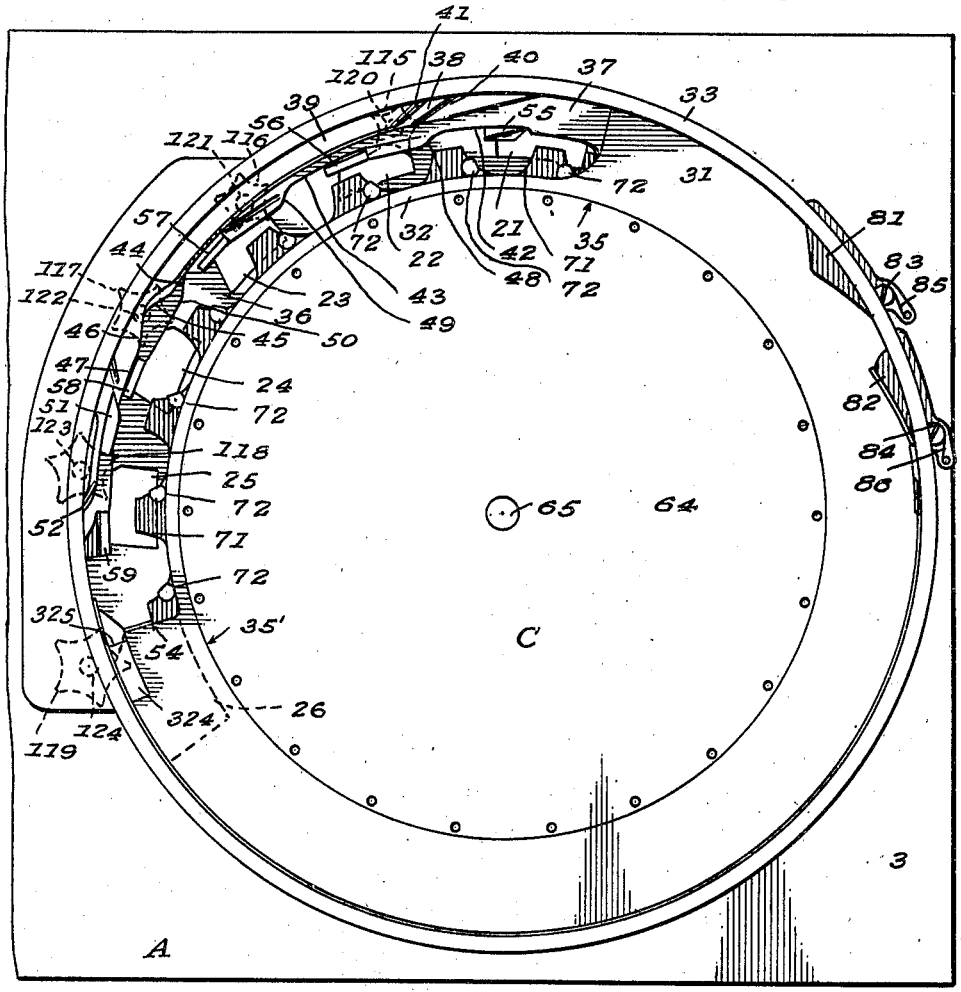
Fig. 10 is a view similar to Fig. 9 with the upper pick-up plate of the rotary conveyor removed.
Figure 16:
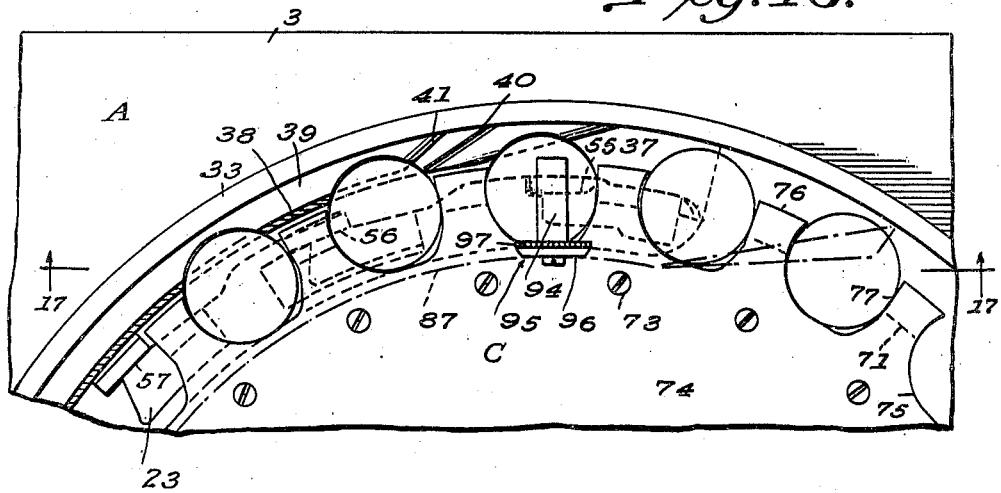
Fig. 16 is a fragmentary view showing in detail the member for depressing an edge of the coins.
Figure 25:
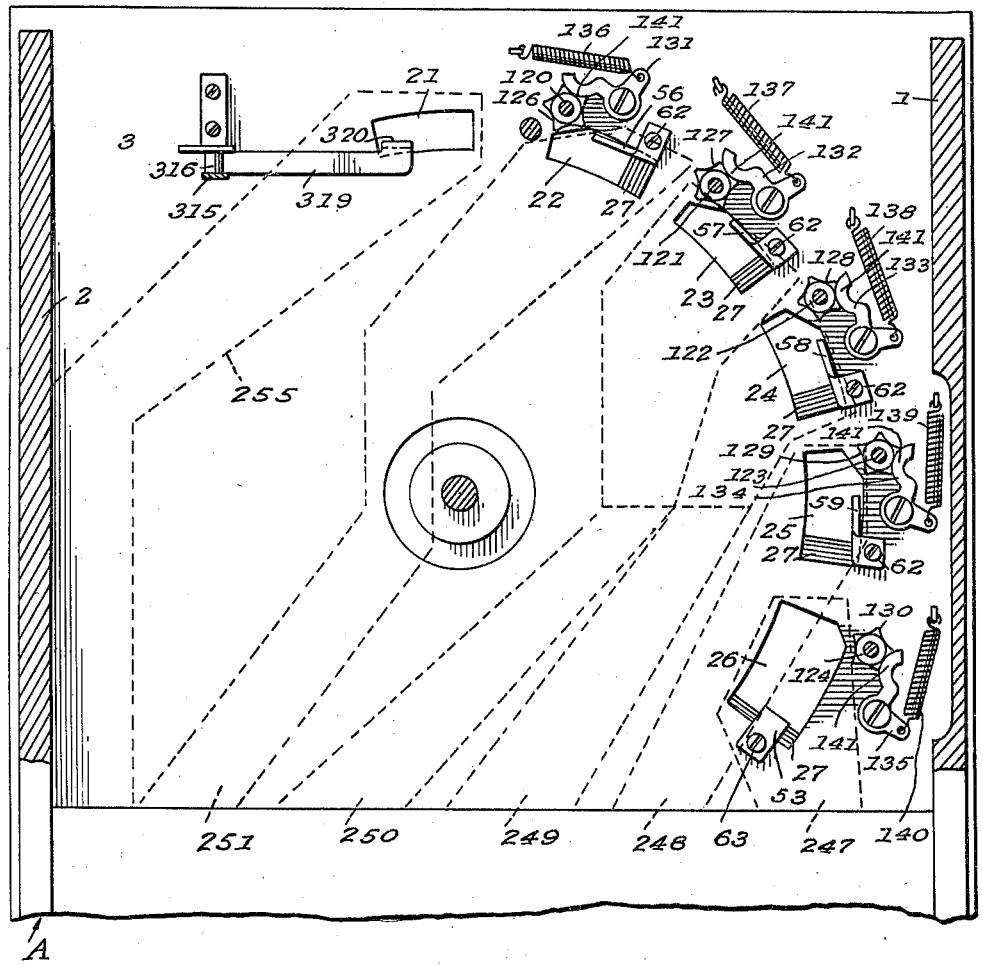
Fig. 25 is a section on the line 25—25 of Fig. 7 with the coin chutes shown in dotted lines.

The front wall 3 of the casing or housing forms the bottom or base plate of the hopper B and is formed with the circumferentially spaced openings 21, 22, 23, 24, 25 and 26 as shown more particularly in Fig. 25 of the drawings and through which tokens and coins are adapted to be discharged in a manner to be later brought out. It will be remembered that in Fig. 25 one is viewing the parts from the rear of the machine. One end of each of the openings 22, 23, 24, 25 and 26 is beveled downwardly as shown at 27, for a purpose to be presently set forth. The outer or upper surface of the wall 3 is recessed to form the stepped surfaces or seats 28, 29 and 30 and a band or ring-like plate 31 is positioned on and secured to the surface or seat 28 and as shown more particularly in Fig. 10 of the drawings is cut away for a portion of its circumference to provide the relatively narrow portion 32 so as not to overlie the openings 21, 22, 23, 24 and 25. An outwardly directed band 33 is secured to the outer wall 3 by the clamping members 34 and as shown this band rests on the relatively wide portion of the ring-like plate 31. The band 33 forms the wall of the hopper B. Positioned on the surface 29, substantially between the points 35—35', shown more particularly in Figs. 10 and 14, is what might be termed a wear plate 36, this plate being formed and adapted to provide openings or recesses aligning with the openings 21, 22, 23, 24 and 25 formed in the wall 3. The front wall 3 with the wear plate 36 extending over a portion of the top thereof forms a base member or support over and upon which the coins are moved. Also secured on the surface or seat 28, between the ends of the cut-out part of the ring-like plate 31, is what might be termed the sorting ledge unit including ledges over which the edges of the coins ride for sorting into separate denominations. The ledges of the sorting unit are preferably formed integral but, if desired, may be formed separately and secured together in the desired manner. The unit, as previously stated, is adapted to be positioned on the surface or seat 28 between the ends of the cut-out part of the ring-like plate 31 and the ledges forming a part of the unit are designated 37, 38 and 39 and shown more particularly in Fig. 11 of the drawings with the edges of the coins of various denominations riding thereover, the ledge 38 being beveled as shown at 40 and the end of the ledge 39 being beveled as shown at 41. The band 33 overlies the outer edge of the ledge 37 as shown more particularly in Fig. 5 of the drawings and the ledges 38 and 39 are positioned adjacent the inner surface of the band 33. A portion 38' projects from the bevel 40 with its end edge inclined as shown at 39' for a purpose which will be later brought out. As shown more particularly in Figs. 9, 10, 11, 14 and 16 of the drawings the inner edge of the ledge 37 projects beyond the inner edge of the ledge 38 and the inner edge of the ledge 38 projects beyond the inner edge of the ledge 39 so that the coins of the different denominations may pass over these projecting edge portions as shown more particularly in Fig. 11 of the drawings. As shown the ledge 37 is of what might be termed plate-like formation resting upon the seat 28 and the ledges 38 and 39 are formed on the top of this plate, the ledge 38 being on a higher level than the ledge 37 and in turn the ledge 39 being on a higher level than the ledge 38. The inner edge of the ledge 37 is cut away as shown at 42, 43 and 44 to permit the edges of the 10¢ coins, 1¢ coins, and the 5¢ coins to drop from the ledge onto the wear plate 36 in a manner to be later described. The inner edge of the ledge 38 is cut away as shown at 45 while the edge of the upper ledge 39 is cut away, as shown at 46. The intermediate cut-out 45 permits the edge of a 25¢ coin to drop from the ledge onto the wear plate 36 and be guided under the overhanging portion 47 of the ledge 39. The coins will be conveyed by the conveyor indicated generally at C and when the 10¢ piece drops from the ledge 37, through the cut-out 42 and drops to a flat position on the wear plate 36, it will pass under and be guided by the over-hanging portion 48 of the ledge 37. As the edge of the 1¢ piece drops from the ledge 37, through the cut-out 43, it will be received flat on the wear plate 36 and be guided under the over-hanging portion 49 of the ledge. The edge of the 5¢ piece will drop from the ledge 37 through the cut-out 44 to be received flat on the wear plate 36 and then guided under the over-hanging portion 50 of the ledge 37. As previously stated the edge of the 25¢ piece will drop through the cut-out 45 onto the over-hanging portion 50 and will be guided under the over-hanging portions 47 and 51 of the ledge 39. The edge of the 50¢ piece rides around the ledge 39 and then passes off of the beveled edge 52 of the ledge, shown more particularly in Figs. 11 and 14 of the drawings, onto the wear plate 36 over which it is conveyed and is stopped by the member 53 and allowed to drop through the opening 26. In this movement the 50¢ piece passes beneath the end 54 of the ring-like plate 31, the opening 26 being positioned beneath this plate or band, as shown more particularly in Fig. 10 of the drawings.

Figures 18, 19:
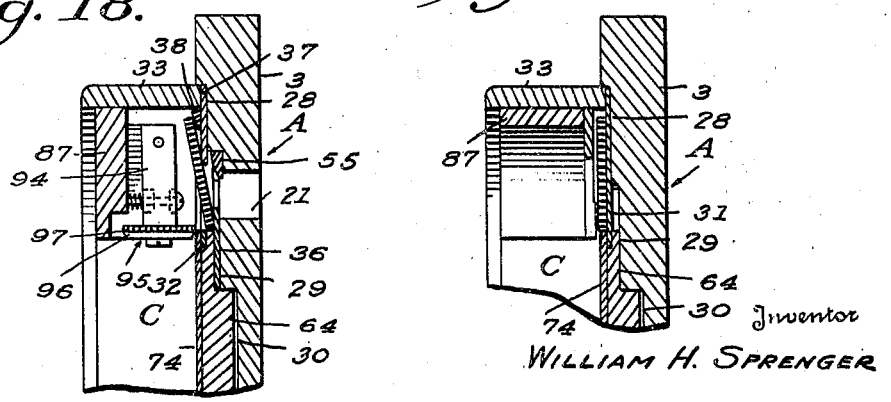
Fig. 18 is a section on the line 18—18 of Fig. 17.
Fig. 19 is a section on the line 19—19 of Fig. 8.

A guide member 55 is positioned at one end of the opening 21, as shown more particularly in Figs. 11, 14 and 18 of the drawings, and has its upper surface beveled or inclined downwardly from a level with the ledge 37 to the upper surface of the wear plate 36. This member guides the edge of a 10¢ piece from the ledge 37 downwardly to the level of the wear plate. In the openings 22, 23, 24 and 25 respectively are positioned the members 56, 57, 58 and 59 each having an inclined upper edge as shown at 60 and a cammed or curved forward edge 61, as shown more particularly in Fig. 12 of the drawings. The upper inclined edge 60, of the member 56, leads from the over-hanging portion 48, of the ledge 37, to the wear plate 36, the inclined or beveled upper edge of the member 57 leads from the over-hanging portion 49 of the ledge 37 to the wear plate 36. The upper inclined or beveled edge of the member 58 leads from the over-hanging portion 50 of the ledge 37 to the wear plate 36 and the inclined upper edge of the member 59 leads from the end of the ledge 39 to the wear plate 36. This arrangement is quite clearly illustrated in Fig. 12 of the drawings. Each of the members 56, 57, 58 and 59 has a right angle extension through which a screw 62 passes, as shown more particularly in Fig. 25 of the drawings, for detachably connecting the members to the bottom of the wall 3 in which the openings are formed. The member 53 is detachably connected in position by the screw 63. As shown more particularly in Fig. 12 of the drawings the beveled ends 27 of the openings 22, 23, 24 and 25 provide bearing surfaces for the members 56, 57, 58 and 59 and permit sufficient width of the right angle extensions of the members 56, 57, 58 and 59 to receive the screw 62. If the ends of the openings were straight instead of beveled as at 27 the members 56, 57, 58 and 59 would have little width at the points where they are secured in position.

As previously stated the rotatable conveyor or elevator, indicated generally at C, is adapted for carrying the coins in the hopper to the sorting unit. This rotatable conveyor or elevator includes a bottom plate 64 which is positioned to operate in the central depressed portion of the front wall 3, over the surface 30, with an edge portion or portions projecting beyond the edge of the depression as is shown more clearly in Figs. 5 and 7 of the drawings and overlying the intermediate surface 29 provided by the stepped formation of the outer or upper face of the front wall 3. The bottom plate 64 is secured to the shaft 65, rotatably mounted in the bearings 66 and 67, the bottom plate being formed on its under surface with a projection 68 for operating in the ballbearing 69, as shown more particularly in Fig. 7 of the drawings. Secured to the shaft 65 is a gear 70 which meshes with the worm gear 16 on the shaft 14, the shaft 14 being rotated by the belt 11 and pulley 13, the belt being driven from the motor shaft 10.

The marginal edge of the bottom plate 64 is formed with the scallops 71 and positioned in the curve of each of the scallops is a projection 72 for a purpose which will be later brought out. As is quite clearly shown in Figs. 5 and 7 of the drawings the projecting edge containing the scallops operates beneath the ring-like plate 31 and over the wear plate 36.

Secured to the upper face of the bottom plate 64, by means of the screws 73 or other suitable fastenings, is a top plate 74 of less thickness than the bottom plate 64 and the marginal edge of this top plate is formed with the scallops 75 which register with the scallops 71 formed in the marginal edge of the bottom plate 64. The projecting arms 76, of the scallops, are formed with the relatively straight driving edge 77 and the curved edges of the scallops between the arms 76 are chamfered as shown at 78 and each of the chamfered portions is formed with a very slight projection 79 which will aid in supporting the coins in the scallops in a manner that will be later brought out. At 80 I have indicated projecting members from the upper or outer surface of the top plate 74 and these are adapted for agitating the coins in the hopper. As is quite clearly illustrated in the drawings the marginal edge of the top plate 74 overlies the ring-like plate 31 and the projecting arm portions 76 of the scallops ride over the lower sorting ledge 37 as is shown quite clearly in Fig. 9 of the drawings. The band 33, forming the wall of the hopper, carries the coin agitators 81 and 82, which are pivotally mounted respectively at 83 and 84, and are pressed inwardly of the hopper by the springs 85 and 86. These coin agitators prevent more than a single coin being received in any one of the scallops 75 of the top plate 74.

Figure 17:
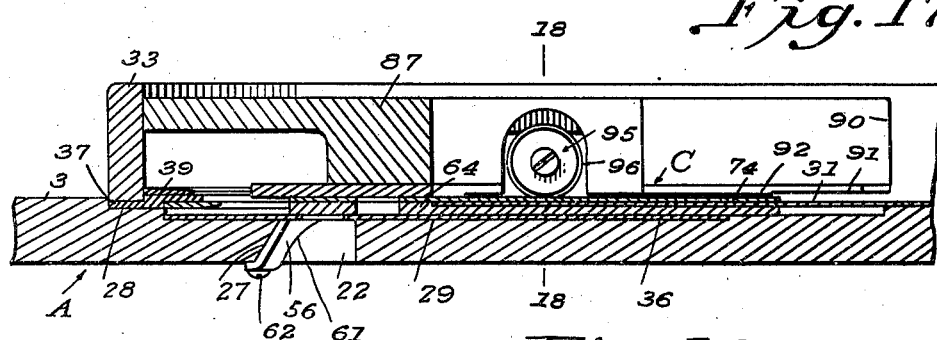
Fig. 17 is a section on the line 17—17 of Fig. 16.

A combined guard and gauge 87 is positioned within the coin hopper, as shown quite clearly in Fig. 1 of the drawings, and is secured to the band 33, forming the wall of the hopper by means of the screws 88 which are received in the slots 89, formed in the upper edge of the band. As is quite clearly illustrated in Fig. 1 of the drawings this guard and gauge overlies the scallops in the conveyor or elevator for a portion of the circumference thereof and prevents more than a single coin passing in each scallop to the coin sorting unit. The coins are conveyed or carried towards the end 90 of the guard and gauge 87 and the under surface of the guard or gauge at this end is formed with the surface 91 on a somewhat higher level than the surface 92, as shown more particularly in Fig. 15 of the drawings, which discloses the underside of the guard and gauge and also in Fig. 17. The surface 92 is on such a level that only a single coin in each scallop may pass beneath the guard and gauge and the surface 91 is provided on a somewhat higher level to permit the tilting of a somewhat distorted coin to prevent jamming. In other words a coin might be slightly convexed and would not pass under the surface 92 if a slight tilting action was not permitted. The opposite end of the guard and gauge is provided with a projecting portion 93, of less height than the remaining portion of the guard or gauge to be received beneath the end of a hopper apron which will be later brought out. This is shown quite clearly in Fig. 8 of the drawings. The guard and gauge carries the pivotally mounted spring-pressed arm 94 on the inner end of which is rotatably mounted a wheel indicated generally at 95 and formed with the beveled portion 96 and knurled edge 97. This wheel is adapted to engage an edge of the coins to depress the same, as shown quite clearly in Fig. 18 of the drawings and in a manner and for a purpose which will be later brought out in connection with the operation of the machine. It will be readily apparent that the guard and gauge 87 may be readily removed from the band 33 by loosening the screws 88 and removing them from the notches 89.

At the bottom of the hopper I provide an apron to hold the coins in the hopper and to support a relatively large batch thereof. This apron includes the relatively heavy semi-circular base portion 98 which fits within the band 33, forming the wall of the hopper, and extending outwardly from this base portion is a wall 99 shaped to correspond with the semi-circular shape of the base portion and formed intermediate the ends with the angular part 100 which extends substantially vertical and forms what might be termed the front wall of the apron. The base portion 98 is formed at one side with the inwardly projecting ledge 101 which is spaced above the rotatable conveyor or elevator, as shown more particularly in Fig. 5 of the drawings and the bottom edge of the base portion is beveled, as shown at 102, so that the coins may pass thereunder. In order to prevent jamming of the coins under the base portion the same is yieldably connected to the band 33. The portion is pivotally connected to the wall, adjacent one end, by the screw 103, and at the opposite end a screw 104 passes through an elongated substantially vertically extending opening 105, formed in the band 33 as shown more particularly in Fig. 2. This permits the base portion 98 to swing on the pivot 103 and in order to normally hold the base portion in its lowermost position I provide the spring-pressed rod 106 which is slidable through the plate 107 connected to the band 33, by means of the screw 108 or other suitable fastener, this screw engaging a depending flange formed on the plate, as shown more clearly in Figs. 1 and 8 of the drawings. The lower end of the spring-pressed rod 106 is received in a socket formed at the end of the shoulder 109 in turn formed by the recess 110 in the outer face of the band or base, as shown more particularly in Fig. 1 of the drawings. At the front of the hopper an angle iron plate 111 is secured to the internal face of the band 33 and is adapted to engage the upper end of a coiled spring 112, carried in a socket 113, formed in the base portion 98, as shown more particularly in Fig. 5 of the drawings. A plate 114 is secured to the base portion 98 and overlies the angle iron plate 111 to limit the downward movement of the base portion relative to the band 33 of the hopper. It will thus be seen that as the conveyor or elevator C is rotated to receive the coins in the scallops, if there is any jamming of the coins beneath the base portion of the apron the same may yield upwardly without breaking the parts, the base portion swinging on the pivot 103.

Figure 8:
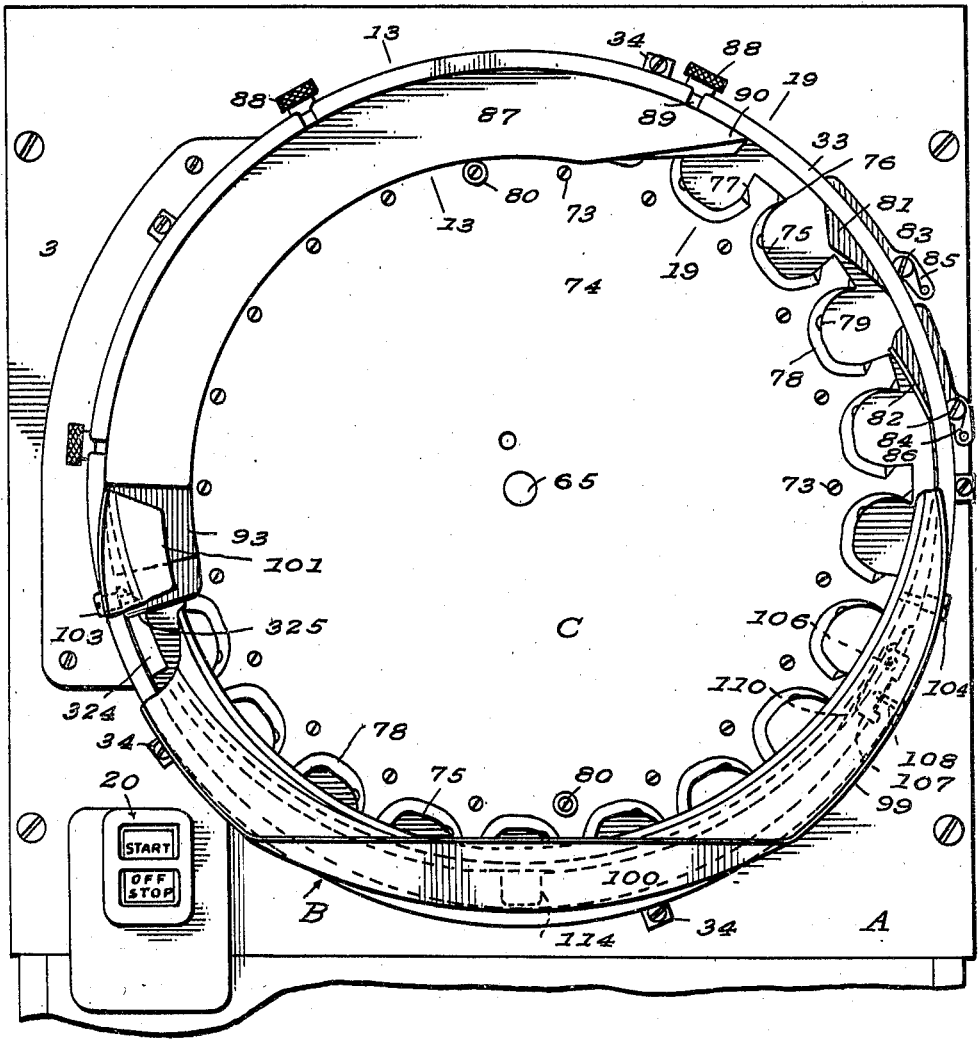
Fig. 8 is a face view of the hopper.
Figure 9:
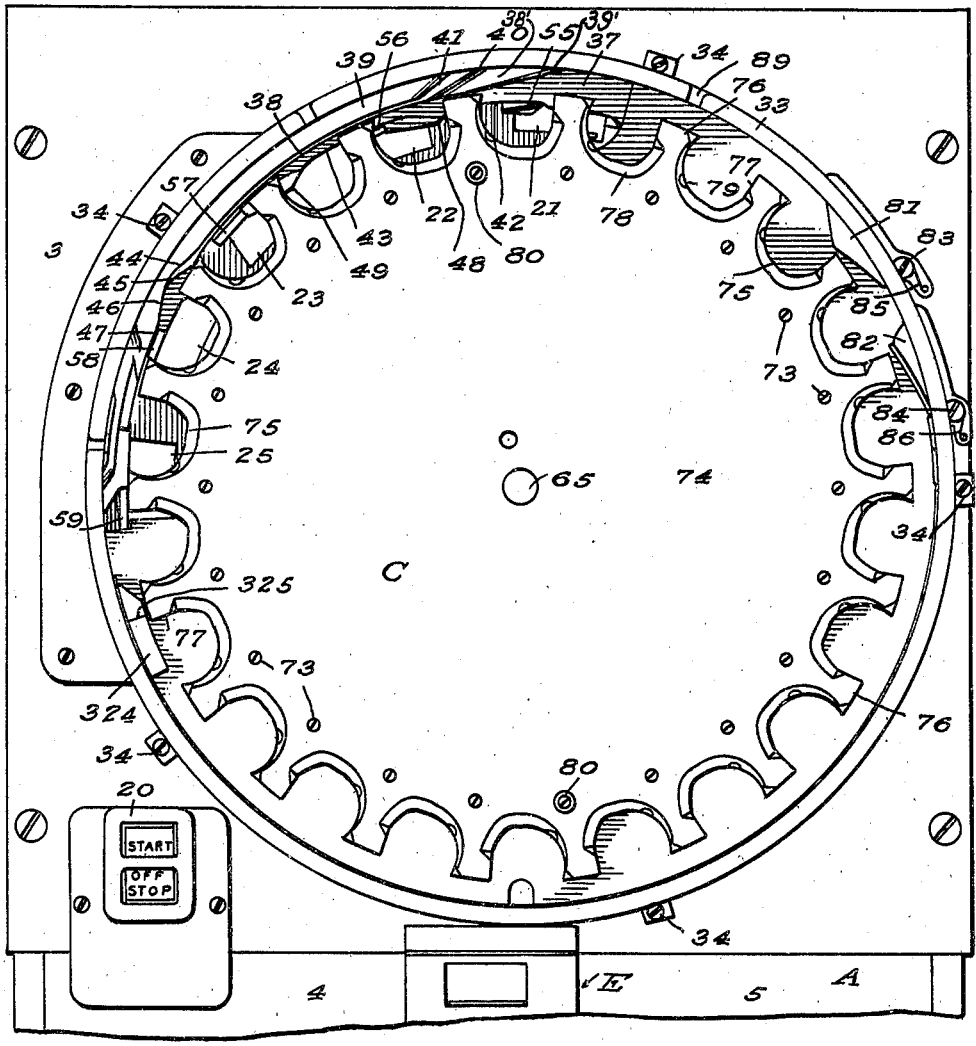
Fig. 9 is a view similar to Fig. 8 with the guard and apron removed.

As shown more particularly in Fig. 8 of the drawings the reduced extension 93, of the guard and gauge 87, extends beneath the end of the base portion 98 of the hopper apron.

As has been previously stated a batch of coins of various denominations will be placed in the hopper B and will normally drop towards the lower side of the hopper at a point where the hopper apron is positioned and then when the elevator or conveyor C is rotated the coins will be agitated by the rotation of the conveyor or elevator and the upwardly directed projections 80 on the upper face thereof. The apron, including the base portion 98 and walls 99 and 100, will prevent the agitated coins from jumping or being thrown from the hopper. A single coin will be received in each of the scallops 75, of the top plate 74, and as the elevator or conveyor is rotated in a counter-clockwise direction the coins will be carried over the ring-like member 31 in a flat-wise position in a direction towards the sorting ledges and the arms 76, formed by the scallops, will drive the coins in an upward direction in the hopper and under the end 90 of the guard and gauge 87. The guard and gauge is positioned above the scalloped edge of the conveyor or elevator such a distance as to allow the thickest normal half dollar or 50¢ piece to pass therebeneath and at such a distance as not to allow two coins of any denomination to pass therebeneath. As described the surface 92, on the underside of the guard or gauge, is on a somewhat lower level than the surface 91 so that should a coin of the thickness of a normal 50¢ piece be distorted it may tilt a little in passing under the guard and gauge without jamming. At times a coin will be distorted to assume a slight concavo-convex shape and in passing under the surface 92 will be tilted to a slight extent and this tilting is accommodated by the surface 91 being on a slightly higher level than the surface 92. Also in order to prevent more than a single coin being received in each of the scallops 75 I provide the yieldable agitators 81 and 82 which will act to displace a second coin which might be resting on the coin in the scallop and return the same into the hopper. The agitator 81 is of such a shape that it will engage the edge of a 50¢ piece in a scallop to cause a slight spinning effect so that the coin will not have a tendency to climp up on the chamfered edge of the scallop and unseat itself. The chamfered edges of the scallops also tend to prevent more than one coin being received in a scallop for if a second coin was riding on the surface of a coin in the scallop it would slide off the chamfered edge back into the hopper.

Figure 26:
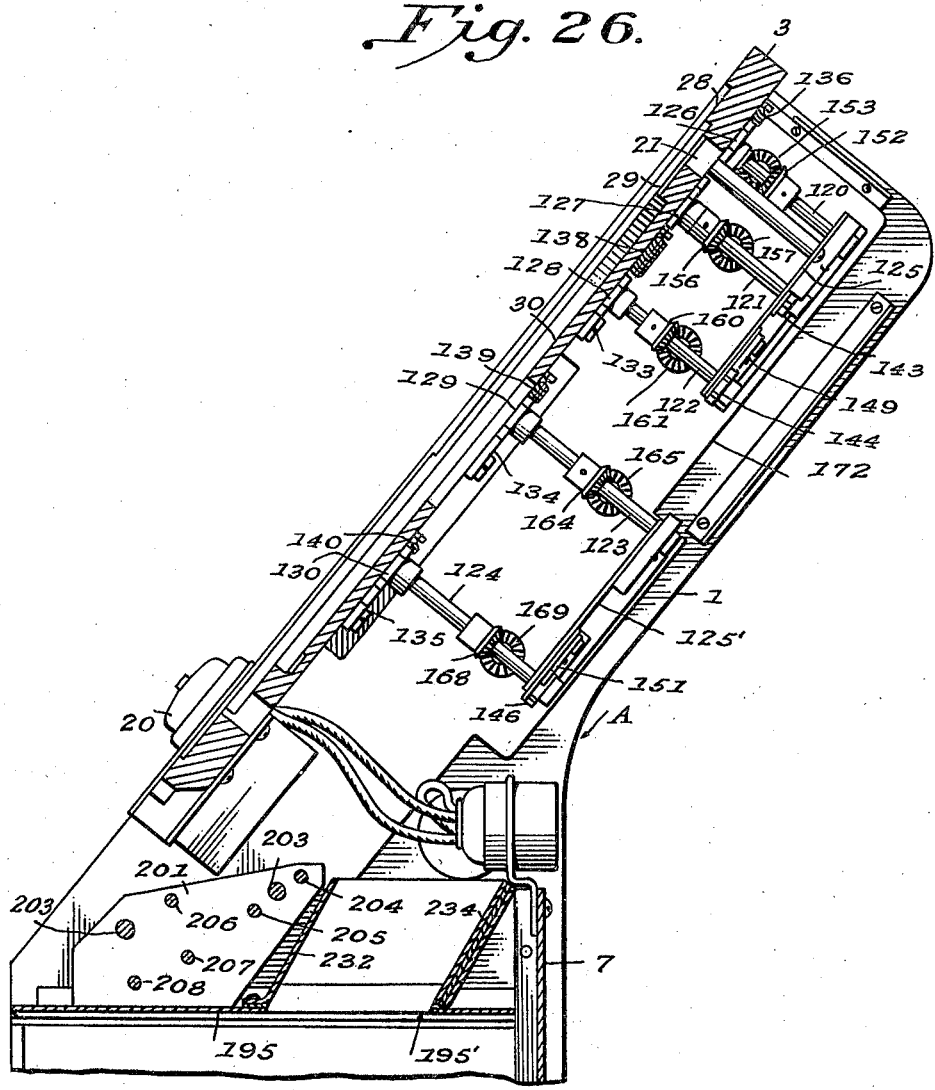
Fig. 26 is a section approximately on the line 26—26 of Fig. 20 looking in the direction of the arrows.

Positioned above the wear plate 36, and beneath the ledges of the sorting unit, are a series of star wheels designated 115, 116, 117, 118 and 119 corresponding in number to the denominations of coins to be sorted. The star wheel 115 being carried by the shaft 120, the star wheel 116 by the shaft 121, the star wheel 117 by the shaft 122, the star wheel 118 by the shaft 123 and the star wheel 119 by the shaft 124. These star wheels are quite clearly illustrated in Figs. 10 and 14 of the drawings. As the coins are carried by the conveyor or elevator they approach the openings 21, 22, 23, 24, 25 and 26 in a counter-clockwise direction and, as is shown more particularly in Fig. 14 of the drawings, the star wheel 115 is positioned adjacent the approach end of the opening 22, the star wheel 116 is positioned adjacent the approach end of the opening 23, the star wheel 117 is positioned adjacent the approach end of the opening 24, the star wheel 118 is positioned adjacent the approach end of the opening 25, and the star wheel 119 is positioned adjacent the approach end of the opening 26. Further these star wheels are positioned so that an arm thereof projects in a position to be engaged by a coin as the same is conveyed in a manner to be later brought out, and to operate the counter or register indicated generally at E. The shafts 120, 121, 122, 123 and 124 pass through and are rotatably mounted in the top plate 3 of the casing or housing with the inner ends of the shafts 120, 121 and 122 supported by the plate 125 and the inner ends of the shafts 123 and 124 supported by the plate 125' shown more partially in Figs. 20 and 26 of the drawings. Secured to the shafts 120, 121, 122, 123 and 124 respectively and positioned in back of the top wall 3 are the star wheels 126, 127, 128, 129 and 130, the positions of these star wheels being more clearly illustrated in Figs. 5, 6, 12 and 25 of the drawings. The star wheels 126, 127, 128, 129 and 130 respectively are adapted to be engaged by the pivotally mounted locking arms 131, 132, 133, 134 and 135, the arms being held in engagement with the star wheels by means of the springs 136, 137, 138, 139 and 140. As shown more particularly in Fig. 25 of the drawings each of the locking arms is formed with a curved portion 141 adapted to be received in the curved portions between the points of the star wheels and lock the shafts, to which the star wheels are attached, against rotation. When the star wheels are rotated by contact of the coins with the star wheels 115, 116, 117, 118 and 119 the locking arms will be swung outwardly against the action of their respective coiled springs and as the points of the star wheels pass the center of the curved portion 141 the tension of the springs in drawing the curved ends of the arms inwardly will ride over the points of the star wheels and give them a quick movement or a snapping action to kick the coins from the star wheels 115, 116, 117, 118 and 119 for discharge through the openings adjacent the respective star wheels.

To prevent overthrow of the star wheels 115, 116, 117, 118 and 119 a ratchet wheel 142 is secured to the inner end of the shaft 120, a ratchet wheel 143 is secured to the inner end of the shaft 121, a ratchet wheel 144 is secured to the inner end of the shaft 122, a ratchet wheel 145 is secured to the inner end of the shaft 123 and a ratchet wheel 146 is secured to the inner end of the shaft 124. The ratchet wheels 142, 143, 144, 145 and 146 are respectively engaged by the spring-controlled pawls 147, 148, 149, 150 and 151 and the engagement of these pawls with the respective ratchet wheels prevent over-running of the star wheels as set forth. In other words, as previously stated, the engagement of the locking arms 131, 132, 133, 134 and 135, with their respective star wheels cause a snapping action as the points of the star wheels pass beyond the center of the curved portions 141 and if the pawls and ratchets were not provided there might be such an over-running of the coins engaging star wheels 115, 116, 117, 118, and 119 as would position the points of the star wheels that they would not be engaged by the coins as the coins are fed along by the agitator or conveyor.

Secured to the shaft 120, intermediate its ends, is a beveled gear 152 which meshes with a beveled gear 153 secured to a horizontally extending shaft 154 on the outer end of which is secured a ratchet wheel 155. Secured to the shaft 121 is a beveled gear 156 which meshes with a beveled gear 157 secured to a horizontal shaft 158 to the outer end of which is secured a ratchet wheel 159. Secured to the shaft 122 is a beveled gear 160 which meshes with a beveled gear 161 secured to a horizontal shaft 162 to the outer end of which is secured a ratchet wheel 163. Secured to the shaft 123 is a beveled gear 164 which meshes with a beveled gear 165 secured to a horizontal shaft 166 to the outer end of which is secured a ratchet wheel 167. Secured to the shaft 124 is a beveled gear 168 which meshes with a beveled gear 169 secured to the horizontal shaft 170 to the outer end of which is secured a ratchet wheel 171. As is quite clearly shown in Figs. 6 and 7 of the drawings the ratchet wheels 155, 159, 163, 167 and 171 are positioned adjacent the inner face of the side wall 1 of the casing or housing.

Figure 27:
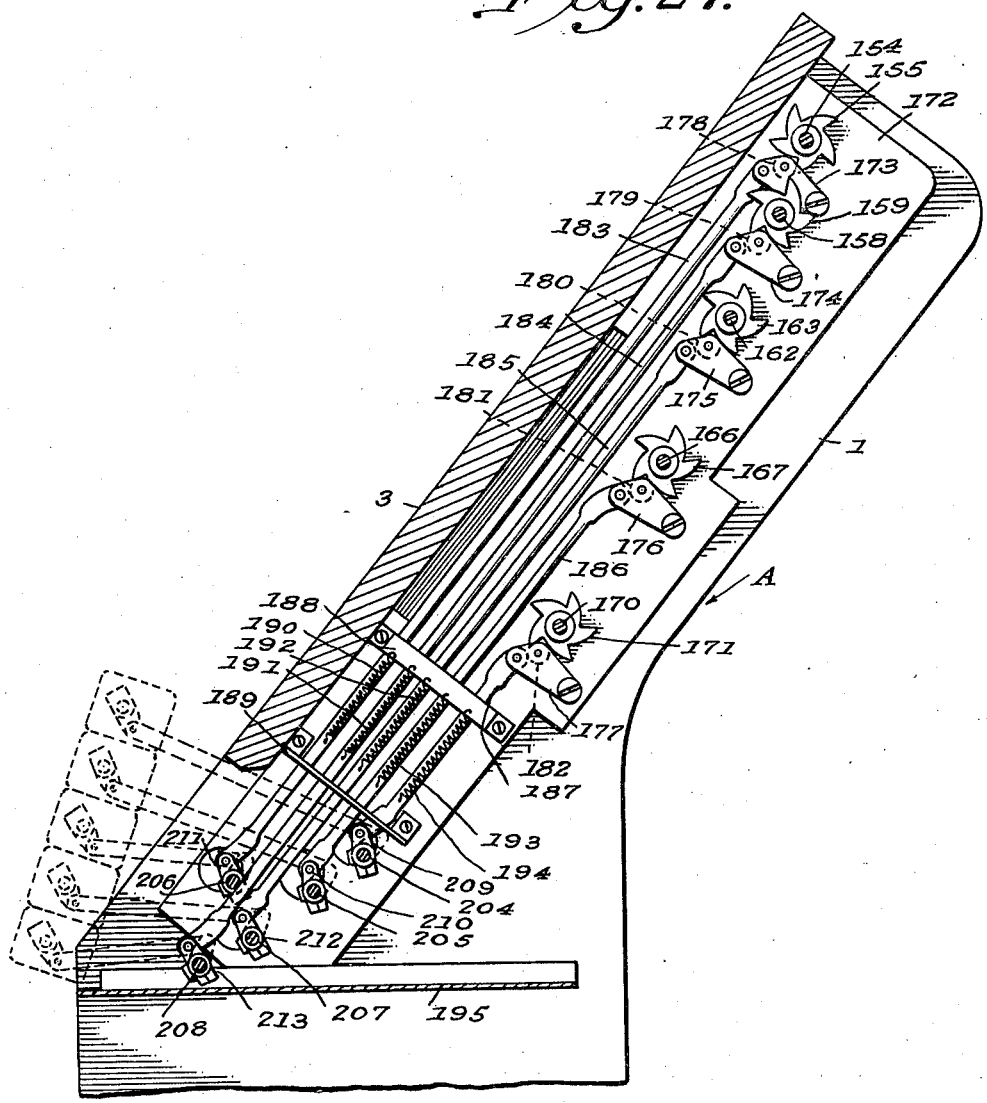
Fig. 27 is a section approximately on the line 27—27 of Fig. 20, looking in the direction of the arrows.
Figure 28:
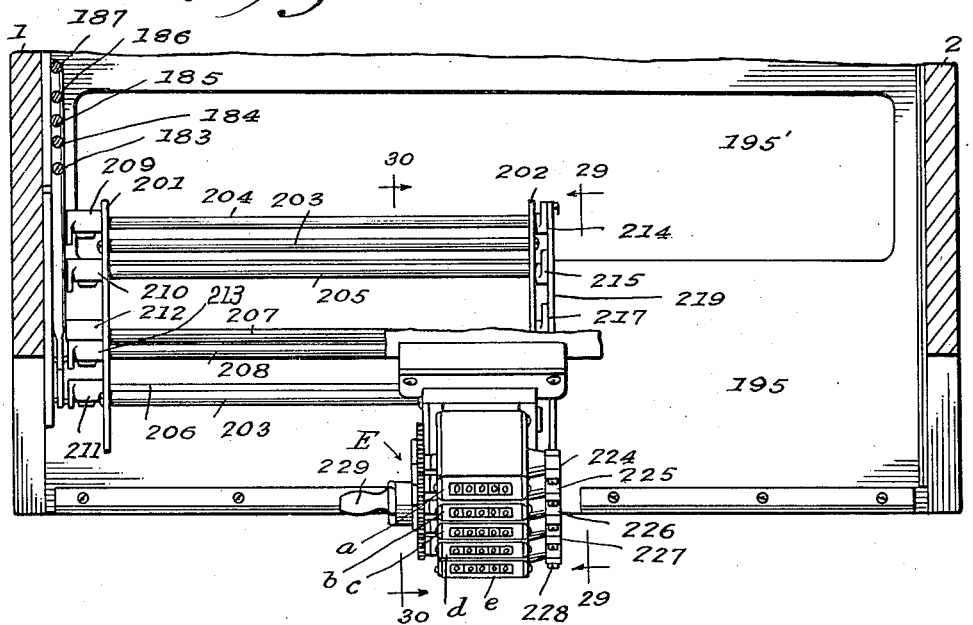
Fig. 28 is a section on the line 28—28 of Fig. 5 looking downwardly with the register in top plan.
Figure 29:
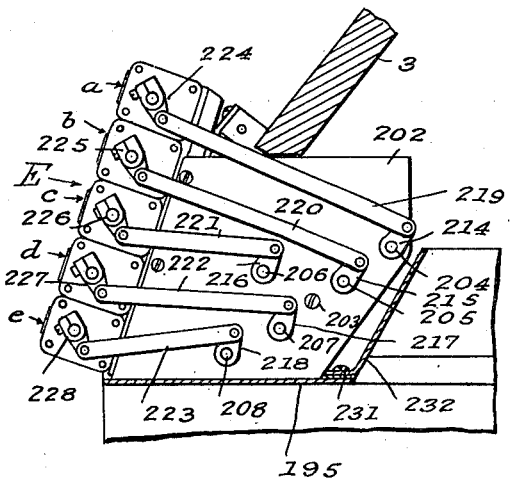
Fig. 29 is a section on the line 29—29 of Fig. 28 looking in the direction of the arrows.

Secured to the inner face of the wall 1 is a plate 172 and pivotally connected to this plate 172 are the arms 173, 174, 175, 176, and 177, the arm 173 having a roller 178 adapted to be engaged by the arms or teeth of the ratchet wheel 155, the arm 174 having a roller 179 adapted to be engaged by the arms or teeth of the ratchet wheel 159, the arm 175 having a roller 180 adapted to be engaged by the arms or teeth of the ratchet wheel 163, the arm 176 having a roller 181 adapted to be engaged by the arms or teeth of the ratchet wheel 167 and the arm 177 having a roller 182 adapted to be engaged by the arms or teeth of the ratchet wheel 171. This is very clearly illustrated in Fig. 27 of the drawings.

Pivotally connected to the arm 173 is a substantially vertically extending rod 183, pivotally connected to the arm 174 is a substantially vertically extending rod 184, pivotally connected to the arm 175 is a substantially vertically extending rod 185, pivotally connected to the arm 176 is a substantially vertically extending rod 186 and pivotally connected to the arm 177 is a substantially vertically extending rod 187. As shown more particularly in Fig. 27 of the drawings these rods 183, 184, 185, 186 and 187 are slidably mounted in the guides or brackets 188 and 189. Connected at one end to the bracket 188 and at the opposite end to the rod 183 is a coiled spring 190. Connected at one end to the bracket 188 and at its opposite end to the rod 184 is a coiled spring 191. Connected at one end to the bracket 188 and at its opposite end to the rod 185 is a coiled spring 192. Connected at one end to the bracket 188 and at its opposite end to the rod 186 is a coiled spring 193. Connected at one end to the bracket 188 and at its opposite end to the rod 187 is a coiled spring 194. These coiled springs 190, 191, 192, 193 and 194 normally hold the rods to which they are connected in raised positions and when the rods are lowered the coiled springs will be placed under tension.

Figure 30:
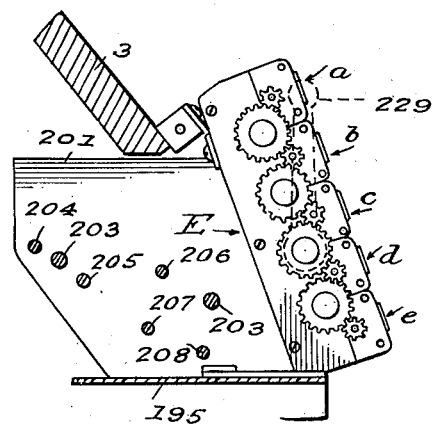
Fig. 30 is a section on the line 30—30 of Fig. 28 looking in the direction of the arrows.

Positioned within the casing or housing, between and secured to the side walls 1 and 2 and above the drawers or receptacles F, is a horizontal plate indicated at 195 provided with the elongated opening 195' divided in a manner to be later described to provide the longitudinally spaced openings 196, 197, 198, 199 and 200. Secured to the upper surface of the plate 195 are the longitudinally spaced brackets 201 and 202 shown more particularly in Figs. 5, 26, 28, 29 and 30 of the drawings and connected by the tie rods 203. Rotatably mounted in the brackets 201 and 202 are the rods 204, 205, 206, 207 and 208, these rods having secured at their ends, adjacent the outer face of the bracket 201, respectively, the arms 209, 210, 211, 212 and 213. The lower end of the substantially vertically extending rod 183 is pivotally connected to the arm 211, the lower end of the substantially vertically extending rod 184 is pivotally connected to the arm 213, the lower end of the substantially vertically extending rod 185 is pivotally connected to the arm 212, the lower end of the substantially vertically extending rod 186 is pivotally connected to the arm 210 and the lower end of the substantially vertically extending rod 187 is pivotally connected to the arm 209. Secured to the opposite ends of the rods 204, 205, 206, 207 and 208 respectively, adjacent the outer face of the bracket 202, are the arms 214, 215, 216, 217 and 218 and pivotally connected to these respective arms are one end of the bars 219, 220, 221, 222 and 223, the opposite ends of the bars being pivotally connected respectively to the arms 224, 225, 226, 227 and 228 of the units a, b, c, d and e of the register or counter indicated generally at E. As this register or counter is of well-known construction a detailed description thereof is not thought necessary other than to say that each unit includes a plurality of registering discs adapted for counting or registering the amount of coins of each denomination sorted, a lever 229 being employed to clear the register or to return the discs to their zero positions. As shown in Fig. 30 of the drawings a train of gears is employed for resetting the discs of the various units in unison upon manipulation of the lever 229. The units a, b, c, d and e are adapted to be enclosed in a casing indicated at 230, this casing being provided, as usual, with openings through which the register or counter may be read. The unit a will register the amount of the 50¢ pieces sorted, the unit b will register the amount of the 25¢ pieces sorted, the unit c will register the amount of the 10¢ pieces sorted, the unit d will register the amount of the 5¢ pieces sorted and the unit e will register the amount of the 1¢ pieces sorted.

Figure 31:
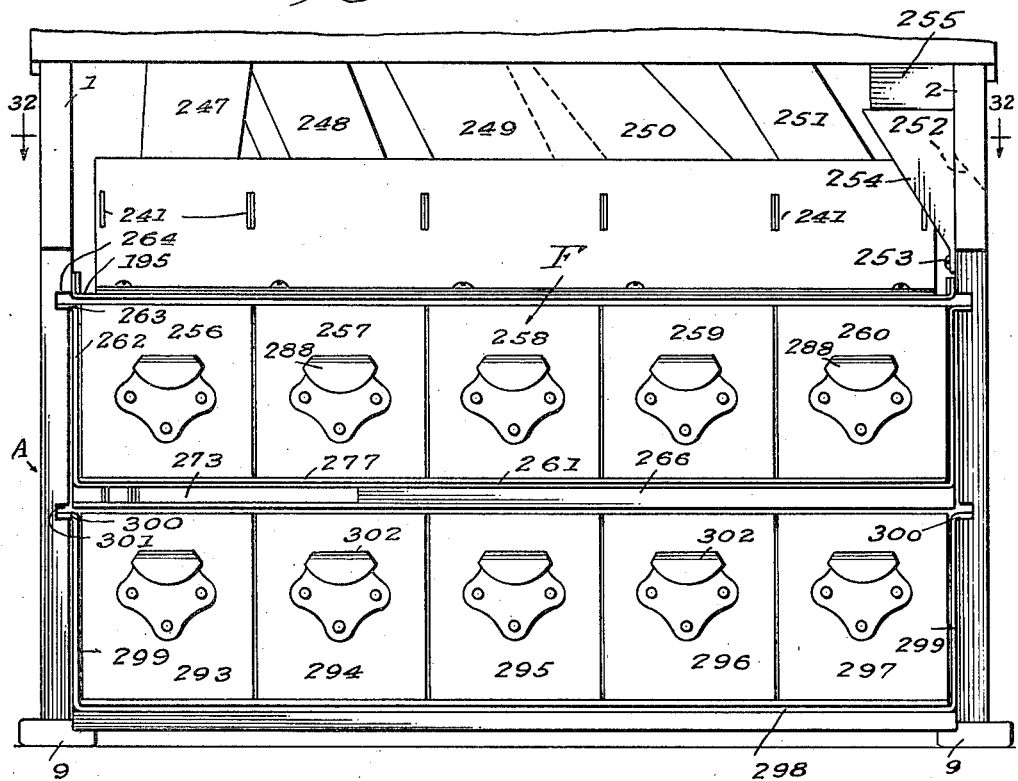
Fig. 31 is a front elevation of the coin receiving receptacles with a cover plate of the housing removed to show the coin chutes leading to the receptacles.
Figure 33:
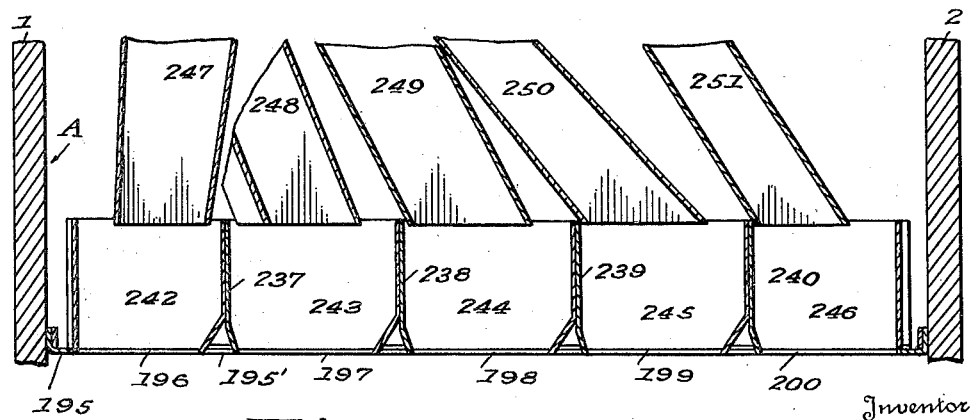
Fig. 33 is a section on the line 33—33 of Fig. 32, looking in the direction of the arrows.

Secured to the plate 195, by means of the screws 231 or other suitable fastenings and extending longitudinally thereof, is a plate 232 forming the front wall of what might be termed a coin guide, the plate extending upwardly at an angle as shown quite clearly in Fig. 34 of the drawings. The rear wall of the coin guide or hopper, shown at 233, is of laminated formation and also extends at an angle parallel with the front plate or wall 232. The wall 233, of the guide or hopper, is secured to the plate 195 by brackets shown at 234. End plates 235 and 236 connect the front and rear walls 232 and 233 and the guide is divided into separate compartments by the transversely extending walls 237, 238, 239 and 240. Each of these transversely extending walls is formed of a pair of plates, the lower ends of which are bent as shown more particularly in Fig. 33 of the drawings to guide the coins into and through the openings 196, 197, 198, 199 and 200. The end walls 235 and 236, as well as the intermediate partitions 237, 238, 239 and 240 have reduced extensions or ears on their ends which pass through the walls 232 and 233, these reduced extensions being designated by the numeral 241 in Fig. 31 of the drawings. It will be noted that the lower edges of the plates, forming the transversely extending walls 237, 238, 239 and 240, extend into the elongated opening 195' to form the spaced openings 196, 197, 198, 199 and 200.

The separate compartments of the guide, formed by the transversely extending partitions and end walls, are designated 242, 243, 244, 245 and 246.

The upper end of a chute 247 is positioned beneath the opening 26 in the coin hopper to receive the 50¢ pieces discharged through the opening and carries them for discharge into the compartment 242 of the coin guide. The upper end of a chute 248 is positioned beneath the opening 25 in the coin hopper to receive the 25¢ pieces which are sorted through the opening 25 and discharges them into the compartment 243 of the coin guide. The upper end of a chute 249 is positioned beneath the opening 24 of the coin hopper to receive 5¢ pieces discharged through the opening and convey them to the compartment 244 of the coin guide. A chute 250 has its upper end positioned beneath the opening 23 of the coin hopper to receive 1¢ pieces discharged through the opening and convey them to the compartment 245 of the coin guide. A chute 251 has its upper end positioned beneath the opening 22 of the coin hopper to receive 10¢ pieces discharged therethrough and convey the same to the compartment 246 of the coin guide. The positions of these chutes are shown more particularly in Figs. 7, 20, 25, 32, 33 and 34.

An opening 252 is formed in the side wall 2 of the casing or housing and secured to the inner face of the wall 2, by means of the screws 253 or other suitable fastenings, is a hopper 254, this hopper being positioned behind the opening 252. The outer face of the hopper is open so that tokens may be discharged therefrom through the opening 252. A chute 255 has its upper end positioned beneath the opening 21, in the coin hopper, to receive car tokens discharged through the opening and the lower end of the chute extends into the open top of the hopper 254, as shown more particularly in Fig. 31 of the drawings. As will be later brought out car tokens are discharged through the opening 21 without being carried to the sorting mechanism.

Positioned in the casing or housing, beneath the plate 195, are the receptacles or drawers indicated generally at F for receiving the sorted coins discharged through the chutes 247, 248, 249, 250 and 251 through the compartments 242, 243, 244, 245 and 246 of the coin guide. The drawers or receptacles are mounted in two tiers, the drawers or receptacles of the upper tier being adapted to temporarily receive the coins, while the drawers or receptacles of the lower tier are adapted to receive coins discharged from the drawers or receptacles of the upper tier. The drawers or receptacles 256, 257, 258, 259 and 260, forming the upper tier are carried by a tray including the bottom portion 261 and vertically extending ends 262, each end having an angular flange 263 adapted to be received in the grooves 264 of the side walls 1 and 2 of the casing or housing. The bottom of the tray is formed with the longitudinally spaced openings 265 and a reinforcing plate 266 is secured to the underside of the bottom 261 by means of the screws 267 or other suitable fastenings, this reinforcing plate being formed with longitudinally spaced openings 268 registering with the openings 265. As shown more clearly in Figs. 36 and 38 of the drawings one side edge of each of the openings 268, in the reinforcing plate, is beveled, as shown at 269, to guide the coins discharged through the openings into the receptacles or drawers of the lower tier. Secured to the bottom of the tray, adjacent the rear longitudinal edge thereof, are the guides 270 in which is slidably mounted a rack bar 271, this rack bar having a downwardly extending projection 272 adapted to be engaged by the rear end of a lever 273 which is pivotally mounted at 274 to the bottom of the tray. The forward end of this lever projects beyond the forward edge of the tray, as shown quite clearly in Fig. 36 of the drawings, to be grasped and used as a handle. A coiled spring 274 has one end secured to the rack bar, as shown at 275, while the opposite end is connected to a member 276, carried by the tray. This is quite clearly illustrated in Fig. 37 of the drawings. A projecting ledge 277 is secured to the forward longitudinal edge of the tray by screws 278 or other suitable fastenings and this ledge projects upwardly beyond the level of the tray bottom to engage the forward ends of the drawers or receptacles to be later described. The ledge 277 may have certain indications or designations thereon showing the denomination of the coins received in the several drawers or pockets. This is shown in Fig. 36. The drawers or receptacles, forming the uper tier adapted to be carried by the upper tray, are shown at 279 and each includes the side walls 280 and end walls 281, the tops and bottoms are open. Rotatably mounted in the end walls, between the side walls, in a bottom member 282 of semi-cylindrical formation, as shown more particularly in Fig. 38 of the drawings, and secured to this rotatable bottom, exteriorly of the rear end wall of the drawer or receptacle, is a gear wheel 283, the gear wheels of the several drawers or receptacles being adapted to mesh with the teeth of the rack bar 271. A pin 284 projects from the rear end of the rotatable bottom 282 and operates in an arcuate elongated opening 285 formed in the rear end of the drawer or receptacle. The engagement of the pin with the ends of the elongated opening limits the rotatable movement of the bottom. Secured to the inner surface of the side wall of each drawer or receptacle is a plate 286 having a beveled surface 287. This plate cooperates with the longitudinal edge of the rotatable bottom to prevent the jamming of coins between the wall of the drawer or receptacle and the rotatable bottom. When the drawers or receptacles are positioned on the tray the gear wheels 283, as previously stated, will mesh with the teeth of the rack bar 271, while the forward end of the drawers or receptacles will be engaged by the inner edge of the ledge 277. This engagement prevents accidental displacement of the drawers or receptacles but the same may be slid from the tray by engaging the handles 288 and slightly raising the forward end of the receptacle or drawer and pulling outwardly. When it is desired to dump the coins from the receptacles or drawers into the receptacles or drawers of the lower tier the end of the lever 273 will be grasped and moved towards the right as shown in Fig. 36. The engagement of the inner or rear end of the lever with the projection 272 will move the rack bar 271 towards the left of Fig. 36 and rotate the gears 283 to in turn rotate the bottoms 282 to allow the coins to be discharged through the openings in the bottom of the tray and into the drawers or receptacles of the lower tier. Each of the rotatable bottoms 282 has a round projection 289 at its forward end and around which extends a coiled spring 290. As shown more particularly in Fig. 38 of the drawings one end of the coiled spring is secured to the pin 291 extending from the projection 289 while the opposite end is secured to a projection 292 on the bottom plate 261 of the drawer or receptacle. This coiled spring normally holds the bottom in its normal coin receiving position when the drawers or receptacles are removed from the supporting tray. Of course, the rack bar 271 will control the movements of the bottoms of the receptacles or drawers when the same are in position upon the tray.

The drawers 293, 294, 295, 296 and 297 of the lower tier are supported by the tray indicated generally at 298, this tray including a bottom on which the drawers or receptacles are supported, upstanding side walls 299, upstanding rear flange 299' and angular flanges 300. The flanges 300 are received in the grooves 301, formed in the side walls 1 and 2 of the casing or housing. Each of the drawers or receptacles is provided with a handle 302 by means of which the same may be removed from the tray when desired. A ledge 303 projects from the forward longitudinal edge of the tray, as shown more particularly in Fig. 39 of the drawings and may bear indicating marks corresponding to the marks on the ledge 277 of the tray of the top tier. This ledge 303 is on a somewhat higher level than the bottom of the tray, as shown in Fig. 39, and engages the ends of the drawers or receptacles to normally prevent sliding movement thereof. The rear ends of the drawers engage the upstanding flange 299'. By raising the forward ends of the drawers or receptacles they may be readily disengaged from the edge of the ledge and slid from the tray.

It will be appreciated that the top and bottom trays may be removed from the casing or housing by sliding movement, the flanges 263 and 300 of the trays being slidable in their respective grooves 264 and 301. As shown more particularly in Fig. 40 of the drawings spring pressed balls or plungers 304 engage the sides of the trays to resist sliding movement thereof, to overcome frictional engagement with the side walls of the casing or housing, and to prevent rattling.

I provide means for reversing the direction of rotation of the elevator or conveyor C when a jam or some other irregularity necessitates a reverse motion. This is of particular advantage in that the means which I provide makes it unnecessary to remove any parts of the machine which would cause the machine to be out of service for some length of time. The shaft 14, which is driven by the belt 11 from the motor, normally rotates the conveyor or elevator in a counter-clockwise direction and in order to reverse the direction of rotation of the conveyor or elevator, in a clockwise direction, I provide what might be termed a turnback wheel indicated at 305 positioned on the outside of the machine adjacent the outer face of the side wall 2. This wheel is carried by a shaft 306 which is rotatably mounted in the side wall 2 of the machine and in a bracket indicated at 307. A pin 308 extends through the shaft, as shown more particularly in Fig. 21 of the drawings, with its ends projecting from the shaft and this pin limits the outward movement of the shaft as well as forming a bearing for a plate 309 against which one end of a coiled spring 310 bears. The opposite end of the spring bears against the face of the bracket 307 and this spring surrounds the shaft and normally urges the shaft in an outward direction until the ends of the pin 308 engage the inner surface of the wall 2. Formed on the shaft, adjacent its inner end, is a collar 311 which is adapted, as shown more particularly in Fig. 21 of the drawings, to engage the bar 312 which is loosely connected at its lower end to the bracket 307 by means of the screw 313 or other suitable fastenings. A bolt 314 passes through an opening adjacent the upper end of the plate or bar 312 and also through an opening formed in the arm 315 of the bell crank lever pivotally connected at 316, a nut 317 being positioned upon the bolt and a coiled spring 318 surrounding the bolt between the nut 317 and arm 315. The opposite arm of the bell crank lever is shown at 319 and is provided at its outer or free end with a lug or projection 320 which passes through the opening 21 formed in the front wall 3, as shown more particularly in Figs. 23, 24 and 25 of the drawings. Normally this lug or projection 320 will be positioned as shown in full lines in Fig. 23 so as not to interfere with the passage of the coins as they are carried to the sorting unit. It will be understood that the bell crank lever, with its associated and operating parts, is positioned on the back of the front wall 3 and the lug or projection 320 passes through the opening 21 towards the front of the machine. Projecting from the outer face of the pulley 13, which is driven by the belt 11, are the pins or projections 321 which are spaced, as shown more particularly in Fig. 21 of the drawings. Pins or projections 322 are positioned adjacent the end of the shaft 306 and while normally positioned out of engagement with the pins or projections 321, as shown more particularly in Fig. 20 of the drawings, may be positioned to engage the pins or projections 321 for operating the shaft 14. The ends of the pins or projections 321 are beveled as shown at 323 to guide the pins 322 into position and to have a tendency to move the pins 322 from engagement with the pins 321 if the shaft 306 should be rotated in a direction to rotate the conveyor or elevator in a counter-clockwise direction, the same direction in which it is driven by the motor. The bevel on one pin or projection 321 is on the opposite side than the bevel on the other pin or projection 321.

Should a coin become jammed under the guard and gauge 87 the motor will be stopped and the conveyor or elevator rotated in a reverse direction by hand through manipulation of the heel 305. By applying pressure on the wheel the shaft 306, which is normally in the position shown in Fig. 20 of the drawings, will be forced inwardly to position the pins or projections 322 between the pins or projections 321. This movement of the shaft 306 causes the collar 311 to engage the bar 312 and draw the same from the position shown in Fig. 20 to the position shown in Fig. 21. The movement of the bar 312 will slide the bolt 314, in the arm 315 of the bell crank lever, and compress the spring 318. The engagement of the spring with the arm 315 of the bell crank lever will swing the bell crank lever on its pivot 316 and swing the arm 319 in a direction towards the bottom surface of the top wall 3 and into the dotted line position shown in Fig. 23. This will cause the projection 320 to move inwardly through the opening 21 and engage the coin overlying the same and raise it into a position so that it will be on a level with the upper surface of the ring-like plate 31 and will be passed thereover as the conveyor or elevator is rotated in a clockwise direction. The conveyor or elevator is rotated by rotation of the shaft 306, with the wheel 305 and the shaft 14 is rotated through engagement of the pins 322 with the pins 321. The worm 16, engaging the gear 70, rotates the conveyor or elevator shaft 65. It will be understood that when the conveyor or elevator is rotated in an anti-clockwise direction, to carry the coins towards the sorting unit when the coins pass from the end of the wider portion of the ring-like plate 31, their inner edges drop by gravity or are forced by the wheel 95 to assume an inclined position such as is illustrated in Figs. 13 and 18 of the drawings so that the inner edges ride on the wear plate 36. The edges of the coins are permitted to drop so that they are received in the scallops 71, of the bottom plate 64 of the conveyor or elevator. With the coins in this position it can be appreciated that when the conveyor or elevator is to be rotated in a reverse direction to free the coin the coin must be raised to a horizontal position to pass onto the wider part of the ring-like plate 31 and thereby positioned in the scallop of the top plate 74 of the conveyor or elevator. When the desired reverse movement has been completed the spring 310 will return the shaft 306 to its normal position shown in Fig. 20 and the coiled spring 318 will draw the bolt 314 and bar 312 into their original positions shown.

When the movement or rotation of the conveyor or elevator is reversed from its normal direction to release a coin, as above described, it is desirable to prevent coins in the hopper from being elevated. To prevent this I provide on the ring-like plate 31, adjacent the edge 54, a cam or wedge 324 formed with the shoulder 325. The reduced end 93, of the guard and gauge 87, is adapted to overlie an end of the cam or wedge and engage the shoulder thereof as shown more clearly in Fig. 5 of the drawings. If, when the elevator or conveyor is rotated in a clockwise direction any coins are picked up in the scallops on the marginal edge of the conveyor or elevator the outer edges thereof will ride over the cam or wedge 324 and be discharged back into the hopper.

From the above detailed description it is thought that the construction and operation of the machine will be clearly understood. As set forth in the objects of the invention the sorting of the coins into various denominations takes place on the same level as the base plate of the hopper and that the outer edges of the coins pass along the sorting ledges according to the diameters of the coins. While the coins themselves are always at a constant radius from the center of the hopper the outer edges are at varied radiuses according to the diameters of the coins. In operation a batch of coins of various denominations is placed into the hopper, indicated generally at B, and will rest upon the rotatable conveyor or elevator denoted at C at the lower part of the hopper. The machine is started for the sorting operation by operating the switch 20 and the operation of the switch places the motor D in operation to in turn drive the belt 11 and through this belt the shaft 14 to which is secured the pulley over which the belt operates. The rotation of the shaft 14, through means of the worm 16 and gear 70, rotates the shaft 65 and the elevator or conveyor secured thereto. The elevator or conveyor is rotated by the motor in a counter-clockwise direction and during its rotation the coins in the hopper will be agitated but prevented from leaving the hopper by the apron formed by the base portion 98, walls 90 and 100 positioned, as shown more clearly in Fig. 5 of the drawings. As stated, the coins will be agitated by the rotation of the elevator or conveyor but as auxiliary agitating means I provide the projections 80, shown more particularly in Fig. 8 of the drawings, which project upwardly from the upper surface of the conveyor or elevator. As the conveyor or elevator is rotated coins of various denominations will be picked up in the scallops of the top plate 74 and carried around over the wider surface of the ring-like plate 31. The portions 77, of the arm 76 of the scallops, act as driving surfaces for carrying the coins. Curved portions of the scallops are chamfered as shown at 78 so that but a single coin can be carried in a single scallop and if a second coin should ride on top of that coin in the scallop it would slide off over the chamfered edge. The coin agitators 81 and 82, which are spring pressed, also act to prevent more than a single coin being received in any one of the scallops 75 of the top plate 74. The slight projections 79, formed on the chambered surfaces, will aid in holding the coins within the scallops. A continued rotation of the elevator or conveyor will carry the coins under the end of the guard and gauge 87 and, as has been previously stated, this guard and gauge is positioned a sufficient distance above the rotary conveyor or elevator to allow a single coin in each scallop to pass thereunder, the distance being sufficient to allow a coin of greatest thickness, such as a 50¢ piece, to pass under. At times a coin may be distorted into concavo-convex form and in order to provide for a sufficient tilting of such a mutilated coin as it passes under the end of the guard and gauge I provide the two surfaces 91 and 92, the surface 91 being on a somewhat higher level than the surface 92. After passing under the end of the guard and gauge they are carried over the sorting unit which includes the ledges 37, 38, and 39 over which the outer edges of the coins will ride, as shown more particularly in Fig. 11 of the drawings. As clearly illustrated the outer edges of the 10¢ piece, 1¢ piece and 5¢ piece will ride on the inner edge of the ledge 37, the outer edge of the 25¢ coin will ride on the inner edge of the ledge 38, being guided upwardly thereon, by means of the beveled end 40. The outer edge of the 50¢ piece will ride around the ledge 39 being guided and raised thereto by the beveled end 41. In passing under the guard and gauge when the coins reach the end of the ring-like plate 31, where it is reduced to form the relatively narrower portion 32, their outer edges will engage the ledges as just described and their inner edges will drop by gravity or be forced down by the wheel 95 to assume the positions shown more particularly by a 50¢ piece in Figs. 13 and 18 of the drawings and engage the wear plate 36 along the dotted and dash line shown in Fig. 14 of the drawings. The lower edges of the coins when thus in this inclined position or positions are received in the scallops 71, formed in the marginal edge of the bottom plate 64, of the conveyor or elevator as shown quite clearly in Fig. 11 of the drawings. As shown in this figure the coins will be driven or elevated by the arm at the right hand side of the scallop, but as the coins reach what might be termed the vertical center through the machine they will ride or roll to contact the projection 72, as shown by the position of the 5¢ piece and the 25¢ piece in Fig. 11. These projections act to properly position the coins within their respective scallops. To provide positive means for lowering the inner edges of the coins, as shown in the positions in Figs. 13 and 18 of the drawings, in case they do not fall into these positions by gravity, I provide the roller or disc 95, carried by the arm 94, pivotally connected to the guard or gauge 87. This roller or disc is shown in position relative to the coins in Figs. 5 and 16 of the drawings and the knurled surface 97 of the roller or disc will engage the coins while the beveled surface 96 rides around or contacts with the upper surface of the conveyor or elevator. The rotation of the conveyor or elevator will carry the 50¢ piece from its position shown in Fig. 11 downwardly with its outer edge riding over the ledge 39 and over the upper beveled surface 60 of the member 59 where it will pass to a flat position on the wear plate 36 and will be carried under the edge 54 of the ring-like plate 31. As it passes to this position it will engage the star wheel 119 to rotate the same for counting on the register E. On passing beyond the star wheel it will drop through the opening 26 and be discharged through the chute 247 to the drawer or receptacle 256. The same operation of the conveyor or elevator will carry the 25¢ piece with its outer edge riding over the ledge 38 until it reaches the cut-outs 45—46 when the edge drops from the ledge onto the over-hanging portion 50 and is guided by the member 58, beneath the over-hanging parts 47 and 51 of the ledge 39 and onto the wear plate. When on the wear plate 36 the coins will lie flat. This position is illustrated more particularly in Fig. 14 of the drawings and a continued movement of the coin will engage and operate the star wheel 118, which in turn will operate the register E. The coin will then be guided by the curved surface 61 of the member 59 to pass through the opening 25 and through the chute 248 to the drawer or receptacle 257. The outer edge of the 5¢ piece will drop from the ledge 37, through the cut-out 44 and ride over the upper inclined surface 60, of the member 57, to be guided under the overhanging portion 50 of the ledge 37 where it will come into engagement with the star wheel 117, as shown more particularly in Fig. 14 of the drawings and operate said star wheel to in turn operate the register E. The coin will engage the curved surface of the member 58 and be guided through the opening 24 and through the chute 249 to the drawer or receptacle 258. The edge of the 1¢ piece on rotation of the conveyor or elevator will drop from the ledge 37, through the cut-out 43, and will be received on the wear plate 36 and be guided by the upper inclined surface 60 of the member 56 under the overhanging portion 49 of the ledge. The 1¢ piece will engage the star wheel 116 and operate the same to in turn operate the register E. The curved surface 61, of the member 57, will direct the coin through the opening 23 and allow the same to be discharged through the chute 250 into the drawer or receptacle 259. Movement of the 10¢ piece, by the conveyor or elevator, will allow the edge thereof to drop from the ledge 37 through the cut-out 42 and fall upon the wear plate 36. It will pass over the inclined surface 60, of the member 55, and be guided under the overhanging portion 48 of the ledge 37. Continued movement of the conveyor or elevator will cause the 10¢ piece to operate the star wheel 115 to in turn operate the register E. The coin then engages the curved surface 61, of the member 56, and is guided through the opening 22 through which it is conveyed by the chute 251 to the drawer or receptacle 260. While my improved form of machine is adapted for sorting coins of various denominations it does not include the counting of car tokens or the like or the depositing of the same into drawers or receptacles. In Fig. 11 of the drawings I have illustrated a car token in one of the scallops of the conveyor or elevator and when this token reaches the opening 21, on rotation of the conveyor or elevator, it will drop through the opening 21 and be discharged through the opening 252 in the side wall 2 of the machine through the chute 255 and hopper 254.

I might repeat that as the machine is operated the elevator or conveyor C normally rotates in a counter clockwise direction and the coins are initially received in the scallops of the top plate 74 and are carried around over the wider surface of the ring-like plate 31, being in flat facewise engagement with said plate. On reaching that point of the plate designated by the numeral 35 in Fig. 10 of the drawings the coins will pass to the cut-out portion of the plate and what might be termed the inner edges of the coins drop by gravity or are forced down by the wheel 95 to be received in the scallops of the bottom plate 64 of the elevator or conveyor and the inner edges of the coins engage the wear plate 36 and are in an inclined position with their outer edges riding over the ledges 37, 38 or 39. The coins remain in the inclined position or positions until they reach the point or points where the outer edges drop from the respective ledges and on dropping from the ledges the coins will be received in a flat facewise position on the wear plate 36 and will remain in this flat position until they are brought into engagement with the respective counting star wheels and after operating these star wheels drop through the respective openings for discharge to the coin receiving drawers or receptacles. As shown more particularly in Figs. 9, 10, 11, 14 and 16 of the drawings, and as previously described, the inner edges of the ledges 37, 38 and 39 are arranged in step-like formation with the inner edge of the ledge 37 extending beyond the inner edge of the ledge 38 and the inner edge of the ledge 38 extending beyond the inner edge of the ledge 39. In Fig. 19 of the drawings I have illustrated a coin in its initial position within a scallop of the top plate 74 of the elevator or conveyor and resting flat in facewise contact with the ring-like plate 31. In Figs. 13 and 18 of the drawings I have illustrated a coin after it has reached the cut-out of the ring-like plate 31 and the inner edge of the coin has dropped by gravity or been forced down into a scallop of the bottom plate 64 of the elevator or conveyor so that the coin is positioned at the incline shown with its outer edge riding over one of the coin sorting ledges. It will be noted that in sorting the coins in the manner set forth the sorting takes place at the same level as the base plate of the hopper with the sorting edges at various radiuses from the center while the coin is always at a constant radius from the center. The coins are initially carried in a flat position in the scallops of the top plate of the conveyor or elevator, they then drop into an inclined position with their inner edges received in the bottom plate of the elevator or conveyor with their outer edges riding over the sorting ledges of the sorting unit and finally they are permitted to drop into a flat position onto the wear plate and brought into contact with the star wheels of the counting mechanism from which they pass and are discharged through the openings in the top plate 3 for final reception in the coin receiving receptacles.

As has been previously described the star wheels 115, 116, 117, 118 and 119 are given a snapping action to impel the coins through their respective openings due to the formation of the star wheels 126, 127, 128, 129 and 130 and the associated locking arms 131, 132, 133, 134 and 135. As the points of the star wheels 126, 127, 128, 129 and 130 pass beyond the center point of the curves 141 of the locking arms, the springs 136, 137, 138, 139 and 140 cause their respective arms, to which they are attached, to snap into the recesses of the star wheels and give a snapping action thereto.

The coins received in the drawers or receptacles 256, 257, 258, 259 and 260 of the upper tier may be held therein temporarily and then discharged into the drawers or receptacles 293, 294, 295, 296 and 297 by manipulation of the bottoms 282 by operation of the handle 273, as previously set forth.

As the 50¢ piece contacts the star wheel 119, as illustrated more particularly in Fig. 14 of the drawings, it rotates the shaft 124, which carries the beveled gear 168, and this beveled gear meshing with the beveled gear 169 rotates the shaft 170 which carries the ratchet wheel 171 and as the ratchet wheel revolves in engagement with the roller 182 it lowers the arm 177 against the action of the coiled spring 197, forces the rod 187 downwardly and in turn rotates the shaft 204 to which is connected the arm 214. The bar 219, connected to the arm 214, operates the arm 224 which in turn operates the unit a of the register or counter for denoting thereon 50¢. This unit on continued operation registers the total amount of the 50¢ pieces passed through the sorter and into the receptacle or drawer 256. A 25¢ piece engaging and operating the star wheel 118 will rotate the shaft 123, which carries the beveled gear 164 meshing with the beveled gear 165, carried by the shaft 166. The ratchet wheel 167, carried by the shaft 166, contacting with the roller 181, operates the rod 186 against the action of the coiled spring 193 and this rod 186 being connected to the arm 210, on the rod 205, will operate the bar 220, connected to the arm 215 and arm 225 to operate the unit b of the register or counter to denote the total amount of the 25¢ pieces passed through the sorting unit for deposit into the drawer or receptacle 257. A 5¢ piece engaging and rotating the star wheel 117 will operate the shaft 122, which carries the beveled gear 160, meshing with the beveled gear 161 on the shaft 162. The ratchet wheel 163, carried by the shaft 162, engaging the roller 180 will lower the rod 185 against the action of the coiled spring 192 to rotate the shaft 207 through connection of the arm 212. The rotation of the rod 212 will operate the bar 222, connected to the arms 217 and 227, to operate the unit d of the register or counter to denote or register the total amount of the 5¢ pieces passed through the sorting unit for deposit into the drawer or receptacle 258. As a 1¢ piece engages and rotates the star wheel 116 it rotates the shaft 121, which carries the beveled gear 156, meshing with the beveled gear 157, carried by the shaft 158. Operation of the shaft 158 causes the ratchet wheel 159, engaging the roller 179, to lower the rod 184 against the action of the coiled spring 191. This rod, through its connection with the arm 213, on the shaft 208, operates the bar 223, connected to the arms 218 and 228 to operate the unit e of the register or counter. This unit e will denote or register the total amount of the 1¢ pieces passed through the sorting unit for deposit into the drawer or receptacle 259. A 10¢ piece passing to the sorting unit will rotate the star wheel 115 to in turn rotate the shaft 120 to which the beveled gear 152 is connected. This beveled gear 152 meshes with a beveled gear 153, carried by the shaft 154, and as the shaft 154 is rotated the ratchet wheel 155, carried thereby, engages the roller 178, on the arm 173, and lowers the rod 183 against action of the coiled spring 190. The lower end of the rod 183 being connected to the arm 211 rotates the shaft 206, having the arm 215 on the opposite end. The movement of the arm 216 operates the bar 221, connected to the arm 226, to operate the unit c of the register or counter to denote or register the total amount of the 10¢ pieces passed through the sorting unit for deposit into the drawer or receptacle 260.

Having fully described my invention what I claim as new and desire to secure by Letters Patent is:

1. In a coin sorting machine, a rotatable coin feeding member comprising top and bottom plates having alined scallops, the edges of the scallops of the top plate being chamfered and each provided with a raised portion and a projection extending outwardly from each scallop of the bottom plate and alining with said raised portion.

2. A coin sorting machine comprising a base member provided with openings corresponding in number to the number of denominations of coins to be sorted, a conveyor for carrying the coins to said openings for discharge therethrough, said conveyor having recesses to receive the coins, sorting means cooperating with said conveyor while moving in one direction to sort the coins, motor means for driving said conveyor in its sorting direction, separate means for reversing the direction of rotation of the conveyor, means adjacent the entrance end of said sorting means for raising a coin clear of the conveyor during a reversing movement, and means adjacent the exit end of said sorting means for removing a coin from the conveyor during a reversing movement.

3. A coin sorting machine comprising a base member provided with openings corresponding in number to the number of denominations of coins to be sorted, a conveyor for carrying the coins to said openings for discharge therethrough, sorting means cooperating with said conveyor while moving in one direction to sort the coins including a gauge plate under which the coins are carried by said conveyor, means for reversing the direction of rotation of the conveyor, motor means for driving said conveyor in its sorting direction, separate means adjacent each end of said gauge plate to prevent jamming of the coins on the reversal of the conveyor, the means at the feeding in end of said gauge plate acting to lift the coin clear of the conveyor, the other means at the exit end of said gauge plate acting to eject a coin from said conveyor.

4. A coin sorting machine comprising a base member provided with openings corresponding in number to the number of the denominations of coins to be sorted, a conveyor for carrying the coins to said openings for discharge therethrough, sorting means cooperating with said conveyor while moving in one direction to sort the coins, motor means for driving said conveyor in its sorting direction, separate means for reversing the direction of rotation of the conveyor, and a member operable by the reversing means for raising a coin clear of said conveyor during the reverse movement thereof to prevent feed of this coin to said sorting means.

5. A coin sorting machine comprising a support provided with openings corresponding in number to the denominations of coins to be sorted, sorting ledges above said support and engaged for a portion of their length by radially outward edges of the coins whose radially inward edges rest upon said support and having recesses permitting the outward edges of said coins to drop so that the sorted coins move flat on the said support before being discharged to their respective openings, and a conveyor for carrying the coins in their inclined and flat conditions to said openings.

6. A coin sorting machine including a hopper to receive coins of various denomination, said hopper having a base portion provided with openings corresponding in number to the denominations of the coins to be sorted, a rotatable conveyor for carrying the coins in the hopper to said openings, said conveyor having marginal recesses to receive the coins, a readily removable member positioned in the hopper and overlying a portion of the face of the rotatable conveyor and covering the openings in said base portion and a portion of the marginal recesses in the conveyor, means carried by said member and removable therewith for engaging the coins for depressing an edge portion thereof to position the coins at an angle during their movement beneath said member, means for holding the coins in an inclined position while still on said conveyor, means for sorting the coins of different diameters as they are carried by the same conveyor, means for guiding the coins of different denominations to their respective openings in said base portion through which they are discharged, and means for receiving the sorted coins.

7. A coin sorting machine comprising an inclined base member, means for sorting the coins into separate denominations while moving over said base member and positioned at an angle with respect thereto, said sorting means being formed and adapted to permit the coins to drop flat on the base member after being sorted, registering means in the path of movement of the coins while flat on the base member and operable by movement of the coins for registering the coins of each separate denomination, and means for feeding the coins, one at a time, while in an angular position during sorting and while flat on said base member and being registered.

8. A coin sorting machine comprising a base member having openings to receive the sorted coins, a plurality of radially spaced circumferentially extending ledges overhanging said base member and having circumferentially disposed cut out portions permitting coins of different denominations to drop from their supporting ledges onto said base member, a movable conveyor for successively carrying the coins along said ledges and after sorting along said base member to said openings, and a gauge means overlying all of said ledges to prevent the movement by said conveyor of more than one coin at a time between said gauge means and said ledges.

9. A coin sorting machine comprising a base member having openings to receive the sorted coins, a plurality of radially spaced circumferentially extending ledges overhanging said base member and having circumferentially disposed cut out portions permitting coins of different denominations and sizes to drop from their supporting ledges onto said base member, an inclined guide member at the entrance end of each cut out portion to assist the descent of the sorted coin to said base member, a movable conveyor for successively carrying the coins along said ledges and after sorting along said base member to said openings, and a gauge means overlying all of said ledges to prevent the movement by said conveyor of more than one coin at a time between said gauge means and said ledges.

10. A coin sorting machine comprising a base member, means for sorting the coins into separate denominations, while the coins are in a position at an angle with respect to the base member, said sorting means being formed and adapted to permit coins to drop flat on the base member after being sorted, registering means in the path of movement of the coins while flat on the base member and operable by movement of the coins for registering the coins of each separate denomination, a rotatable member for conveying the coins as they are being sorted and registered, said rotatable member including a portion adapted to initially receive and convey the coins above the base member while parallel thereto and a portion to receive and convey the coins while in the angular position during sorting and while flat on the base plate and being registered.

11. A coin sorting machine comprising a base member, means for sorting the coins into separate denominations, while in a position at an angle with respect to the base member, said sorting means being formed and adapted to permit coins to drop flat on the base member after being sorted, registering means in the path of movement of the coins while flat on the base member and operable by movement of the coins for registering the coins of each separate denomination, a rotatable member for conveying the coins as they are being sorted and registered, said rotatable member including a top plate having scallops to initially receive the coins and convey the coins above the base member while moving parallel thereto and a bottom plate having scallops to receive and convey the coins while in the angular position during sorting and while flat on the base member and being registered.

12. A coin sorting machine comprising a support having openings corresponding in number to the denominations of coins to be sorted, a ring-like plate having a cut out portion overlying the openings in said support, sorting ledges at the cut out portion of said plate, a rotatable member operable to carry coins over said ring-like plate and to said openings to permit the coins to drop through appropriate openings, said rotatable member including juxtaposed plates, one a top plate having scallops overlying the ring-like plate and adapted to initially receive and convey the coins over said ring-like plate to said cut out portion, the other a bottom plate having scallops alined with those of the top plate and underlying the ring-like plate to receive the coins and convey them in inclined condition along said sorting ledges and in sorted condition to said openings.

13. A coin sorting machine comprising a base member having openings to receive the sorted coins, a plurality of ledges overhanging said base member and having cut out portions permitting coins of different denominations and sizes to drop from their supporting ledges onto said base member, a movable conveyor for successively carrying the coins along said ledges and after sorting along said base member to said openings, a gauge means overlying all of said ledges to prevent the movement by said conveyor of more than one coin at a time between said gauge means and said ledges, and separate means at each end of said gauge means to prevent the conveyor feeding coins to said ledges on a reversal of said conveyor.

14. A coin sorting machine comprising a base member having openings to receive the sorted coins, a plurality of ledges overhanging said base member and having cut out portions permitting coins of different denominations and sizes to drop from their supporting ledges onto said base member and having portions beyond said cut out portions overlying said base member to cooperate with said base member to guide the coins to said openings, a single movable conveyor for successively carrying the coins along said ledges and after sorting along said base member to said openings, means for registering the total amount of coins of each separate denomination including star wheels positioned beneath the overlying portions of said ledges beyond said cut out portions and in the path of movement of the coins and operable by contact thereof.

15. A coin sorting machine having a base member mounted in a position inclined to vertical, a flat rotatable coin conveyor disposed over said base member, a cylindrical hopper surrounding said conveyor and including a lower wall member overhanging said conveyor, means for yieldingly pivotally supporting said lower wall member to permit its movement to prevent jamming of coins between it and said conveyor, sorting means at the upper portion of the hopper, said conveyor carrying the coins from the bottom of the hopper to said sorting means.

16. In a coin sorting machine, the combination of a support provided with openings corresponding in number to the number of denominations of the coins to be sorted, a rotatable member for conveying the coins during both sorting and registering to said openings, open-faced sorting means above said openings, a readily removable member overlying said sorting means and a portion of the face of the rotatable conveyor member and covering the openings in said base and preventing the movement by said conveyor of more than one coin at a time between it and said sorting means, open faced guide means beneath said sorting means including said support and along which the sorted coins are carried by said rotatable member to said openings, registering means positioned in said guide means in the path of movement of the coins and operable by contact thereof, the removal of said overlying member exposing said sorting means and guiding means to direct access by the operator in case it becomes necessary to remove a jammed coin therefrom.

17. In a coin sorting machine, the combination of a support provided with openings corresponding in number to the number of denominations of coins to be sorted, open-faced sorting means above said openings, a rotatable member for conveying the coins during sorting and to said openings, a readily removable member overlying said sorting means and a portion of the face of the rotatable conveyor member and covering the openings in said support and preventing the movement by said conveyor of more than one coin at a time between it and said sorting means, and open-faced guide means beneath said sorting means and including said support and along which the sorted coins are carried by said rotatable member to said openings.

WILLIAM H. SPRENGER.